(12) United States Patent
Lee

(10) Patent No.: US 12,045,418 B2
(45) Date of Patent: Jul. 23, 2024

(54) ELECTRONIC DEVICE

(71) Applicant: Samsung Display Co., Ltd., Yongin-si (KR)

(72) Inventor: Soongyu Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/857,024

(22) Filed: Jul. 3, 2022

(65) Prior Publication Data

US 2023/0009064 A1    Jan. 12, 2023

(30) Foreign Application Priority Data

Jul. 6, 2021    (KR) .................. 10-2021-0088734
Dec. 10, 2021   (KR) .................. 10-2021-0176963

(51) Int. Cl.
  *G06F 3/041*    (2006.01)
  *G06F 3/044*    (2006.01)

(52) U.S. Cl.
  CPC ........ *G06F 3/04184* (2019.05); *G06F 3/0446* (2019.05); *G06F 2203/04108* (2013.01)

(58) Field of Classification Search
  CPC .............. G06F 3/04184; G06F 3/0446; G06F 2203/04108; G06F 3/04182; G06F 3/0412
  See application file for complete search history.

(56) References Cited

U.S. PATENT DOCUMENTS

| | | | |
|---|---|---|---|
| 9,870,097 B2 | 1/2018 | Joharapurkar et al. | |
| 10,120,509 B2* | 11/2018 | Chandran | G06F 3/0443 |
| 10,198,108 B2 | 2/2019 | Kiing et al. | |
| 10,656,742 B2 | 5/2020 | Kim et al. | |
| 10,963,084 B2 | 3/2021 | Ko | |
| 11,073,945 B1* | 7/2021 | Pundak | G06F 1/1647 |
| 11,320,934 B1* | 5/2022 | Vaze | G06F 3/0445 |
| 11,354,000 B1* | 6/2022 | Shen | G06F 3/04166 |
| 2013/0194229 A1* | 8/2013 | Sabo | G06F 3/0412 345/174 |
| 2014/0049507 A1* | 2/2014 | Shepelev | G06F 3/04184 345/174 |
| 2015/0029141 A1* | 1/2015 | Jo | G06F 3/04182 345/174 |

(Continued)

FOREIGN PATENT DOCUMENTS

| | | |
|---|---|---|
| KR | 10-1528687 | 6/2015 |
| KR | 10-2016-0112559 | 9/2016 |

(Continued)

*Primary Examiner* — Ibrahim A Khan

(74) *Attorney, Agent, or Firm* — Lewis Roca Rothgerber Christie LLP

(57) ABSTRACT

An electronic device including a display layer, a sensor layer that senses a first input by proximity sensing and a second input by a touch, wherein the sensor layer is disposed on the display layer and includes a plurality of first electrodes extending in a first direction and a plurality of second electrodes extending in a second direction intersecting the first direction, and a control unit that controls the sensor layer. When the first input is sensed, the control unit obtains a measurement signal from one of the plurality of first electrodes, obtains a noise signal from another of the plurality of first electrodes, and determines whether the first input is sensed, based on the measurement signal and the noise signal.

26 Claims, 14 Drawing Sheets

(56) References Cited

U.S. PATENT DOCUMENTS

| | | | |
|---|---|---|---|
| 2015/0144920 A1* | 5/2015 | Yamazaki | G06F 3/0447 |
| 2015/0220206 A1* | 8/2015 | Knausz | G06F 3/0412 |
| | | | 345/174 |
| 2015/0309658 A1* | 10/2015 | Stevenson | G06F 3/0445 |
| | | | 345/176 |
| 2015/0324033 A1* | 11/2015 | Kim | G06F 3/04166 |
| | | | 345/174 |
| 2015/0355762 A1* | 12/2015 | Tripathi | H04N 3/24 |
| | | | 345/173 |
| 2016/0188142 A1* | 6/2016 | Oh | G06F 1/3265 |
| | | | 345/87 |
| 2016/0274726 A1 | 9/2016 | Chung et al. | |
| 2016/0291718 A1* | 10/2016 | Cho | G06F 3/0446 |
| 2017/0075448 A1* | 3/2017 | Kang | G06F 3/0412 |
| 2017/0315658 A1* | 11/2017 | Vandermeijden | G06F 3/04166 |
| 2017/0323135 A1* | 11/2017 | Kang | G06F 3/044 |
| 2017/0336892 A1* | 11/2017 | Chang | H04N 3/24 |
| 2018/0143730 A1* | 5/2018 | Chang | G06F 3/0446 |
| 2018/0239493 A1* | 8/2018 | Khazeni | G06F 3/0443 |
| 2018/0267666 A1* | 9/2018 | Park | G06V 40/1365 |
| 2018/0329573 A1* | 11/2018 | Liu | G06F 3/04184 |
| 2019/0079634 A1* | 3/2019 | Kravets | G06F 3/045 |
| 2019/0294310 A1* | 9/2019 | Lee | G06F 3/04184 |
| 2020/0103993 A1* | 4/2020 | Krah | G06F 3/04182 |
| 2020/0168671 A1* | 5/2020 | Jang | H10K 59/131 |
| 2020/0301539 A1* | 9/2020 | Lee | G06F 3/04182 |
| 2020/0319740 A1* | 10/2020 | Ko | G06F 3/044 |
| 2020/0375545 A1 | 12/2020 | Kim et al. | |
| 2021/0004135 A1 | 1/2021 | Kim et al. | |
| 2023/0376151 A1* | 11/2023 | Zerbe | G06F 3/044 |

FOREIGN PATENT DOCUMENTS

| | | |
|---|---|---|
| KR | 10-2018-0090936 | 8/2018 |
| KR | 10-2020-0117100 | 10/2020 |
| KR | 10-2020-0139296 | 12/2020 |
| KR | 10-2021-0003986 | 1/2021 |

* cited by examiner

ELECTRONIC DEVICE

CROSS REFERENCE TO RELATED APPLICATIONS

This application claims priority from and the benefit of Korean Patent Application No. 10-2021-0088734, filed on Jul. 6, 2021, and Korean Patent Application No. 10-2021-0176963, filed on Dec. 10, 2021, which are hereby incorporated by reference for all purposes as if fully set forth herein.

BACKGROUND

Field

Embodiments of the present invention relate generally to an electronic device with improved reliability and accuracy of proximity sensing.

Discussion of the Background

Multimedia electronic devices, such as a TV, a mobile phone, a tablet computer, a navigation system, and a game console, include an electronic device that displays an image. In addition to a general input method, such as a button, a keyboard, or a mouse, an electronic device may include a sensor layer capable of providing a touch-based input method that allows a user to enter information or commands easily and intuitively. The sensor layer may detect whether a body of the user comes close.

The above information disclosed in this Background section is only for enhancement of understanding of the background of the invention and, therefore, it may contain information that does not constitute prior art.

SUMMARY

Embodiments of the present invention provide an electronic device with improved reliability and accuracy of proximity sensing.

Additional features of the inventive concepts will be set forth in the description which follows, and in part will be apparent from the description, or may be learned by practice of the inventive concepts.

An embodiment of the present invention provides an electronic device including a display layer, a sensor layer that senses a first input by proximity sensing and a second input by a touch, wherein the sensor layer is disposed on the display layer and includes a plurality of first electrodes extending in a first direction and a plurality of second electrodes extending in a second direction intersecting the first direction, and a control unit that controls the sensor layer. When the first input is sensed, the control unit may obtain a measurement signal from one of the plurality of first electrodes, may obtain a noise signal from another of the plurality of first electrodes, and may determine whether the first input is sensed, based on the measurement signal and the noise signal.

The sensor layer may operate in a first sensing mode when the display layer displays a moving image and may operate in a second sensing mode different from the first sensing mode when the display layer displays a still image or does not display an image.

The first sensing mode may include a plurality of frames, and each of the plurality of frames may include one first period and a plurality of second periods.

The control unit may include a signal receiving unit including a first input terminal and a second input terminal. In the first period, the measurement signal may be applied to the first input terminal, and the noise signal may be applied to the second input terminal.

The first input terminal may be electrically connected with the one of the plurality of first electrodes, and the second input terminal may be electrically connected with the another of the plurality of first electrodes.

The control unit may reduce a noise level of the measurement signal based on a signal output from the signal receiving unit.

In each of the second periods, the measurement signal may be applied to the first input terminal, and a ground signal may be applied to the second input terminal.

The second sensing mode may include a plurality of second frames, each of the plurality of second frames may include "n" first periods and "m" second periods, where "n" is greater than 1.

In the first sensing mode, the another of the plurality of first electrodes may be spaced from the one of the plurality of first electrodes as much as a first distance. In the second sensing mode, the another of the plurality of first electrodes may be spaced from the another of the plurality of first electrodes as much as a second distance less than the first distance.

The electronic device may further include a memory that stores a first lookup table in which the another of the plurality of first electrodes is selected to correspond to the one of the plurality of first electrodes, and a second lookup table different from the first lookup table.

The control unit may obtain the measurement signal and the noise signal based on the first lookup table when the first input is sensed and may obtain the measurement signal and the noise signal based on the second lookup table when the first input and the second input are sensed.

When the second input is sensed, the another of the plurality of first electrodes may not overlap an area in which the touch is applied.

When the second input is sensed, the control unit may determine whether the first input is sensed, only based on the measurement signal.

The control unit may include a conversion circuit that converts the measurement signal and the noise signal into digital signals, respectively, and the control unit may reduce the noise level of the measurement signal based on the digital signals of the measurement signal and the noise signal.

Another embodiment of the present invention provides an electronic device including a display layer, a sensor layer that is disposed on the display layer, includes a plurality of first electrodes extending in a first direction, and measures hovering and a touch of a body, and a control unit that controls the sensor layer. The control unit may obtain a measurement signal from each of measurement electrodes, which overlap the body in a plan view, from among the plurality of first electrodes, may obtain a noise signal from each of noise electrodes, which do not overlap the body in a plan view, from among the plurality of first electrodes, and may reduce a noise level of the measurement signal based on the measurement signal and the noise signal.

The control unit may include a signal receiving unit including a first input terminal and a second input terminal. In sensing the hovering, the measurement signal may be applied to the first input terminal, and the noise signal may be applied to the second input terminal.

The control unit may reduce the noise level of the measurement signal based on a signal output from the signal receiving unit.

In sensing the touch, the measurement signal may be applied to the first input terminal, and a ground signal may be applied to the second input terminal.

The control unit may include a conversion circuit that converts the measurement signal and the noise signal into digital signals, respectively, and the control unit may reduce the noise level of the measurement signal based on the digital signals of the measurement signal and the noise signal.

The electronic device may further include a memory that stores a lookup table in which another of the plurality of first electrodes is selected to correspond to one of the plurality of first electrodes.

The control unit may select the noise electrode based on the lookup table.

Another embodiment of the present invention provides an electronic device including a display layer, a sensor layer that measures biometric information of a body, wherein the sensor layer is disposed on the display layer and includes a plurality of first electrodes extending in a first direction and a plurality of second electrodes extending in a second direction intersecting the first direction, and a control unit that controls the sensor layer. The control unit may obtain a measurement signal from one of the plurality of first electrodes, may obtain a noise signal from another of the plurality of first electrodes, and may reduce a noise level of the measurement signal based on the measurement signal and the noise signal.

In a plan view, the one of the plurality of first electrodes may overlap the body, and the another of the plurality of first electrodes may not overlap the body.

The sensor layer may operates with a plurality of frames, each of the plurality of frames may include "n" first periods and "m" second periods, and the "n" may be smaller than the "m".

The control unit may include a signal receiving unit including a first input terminal and a second input terminal. In each of the first periods, the measurement signal may be applied to the first input terminal, and the noise signal may be applied to the second input terminal.

The first input terminal may be electrically connected with the one of the plurality of first electrodes, and the second input terminal may be electrically connected with the another of the plurality of first electrodes.

In each of the second periods, the measurement signal may be applied to the first input terminal, and a ground signal may be applied to the second input terminal.

The control unit may reduce the noise level of the measurement signal based on a signal output from the signal receiving unit.

The electronic device may further include a memory that stores a lookup table in which a specific electrode not overlapping the body in a plan view from among the plurality of first electrodes is selected to correspond to each of first electrodes overlapping the body in a plan view from among the plurality of first electrodes.

The control unit may select the one of the plurality of first electrodes based on the lookup table.

The control unit may include a conversion circuit that converts the measurement signal and the noise signal into digital signals, and the control unit may reduce the noise level of the measurement signal based on the digital signals of the measurement signal and the noise signal.

The one of the plurality of first electrodes may be spaced from the another of the plurality of first electrodes, with at least one of the others of the plurality of first electrodes interposed therebetween.

Each of the plurality of first electrodes may be supplied with a first touch signal from the control unit, and each of the plurality of second electrodes may provide a second touch signal to the control unit based on the first touch signal.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
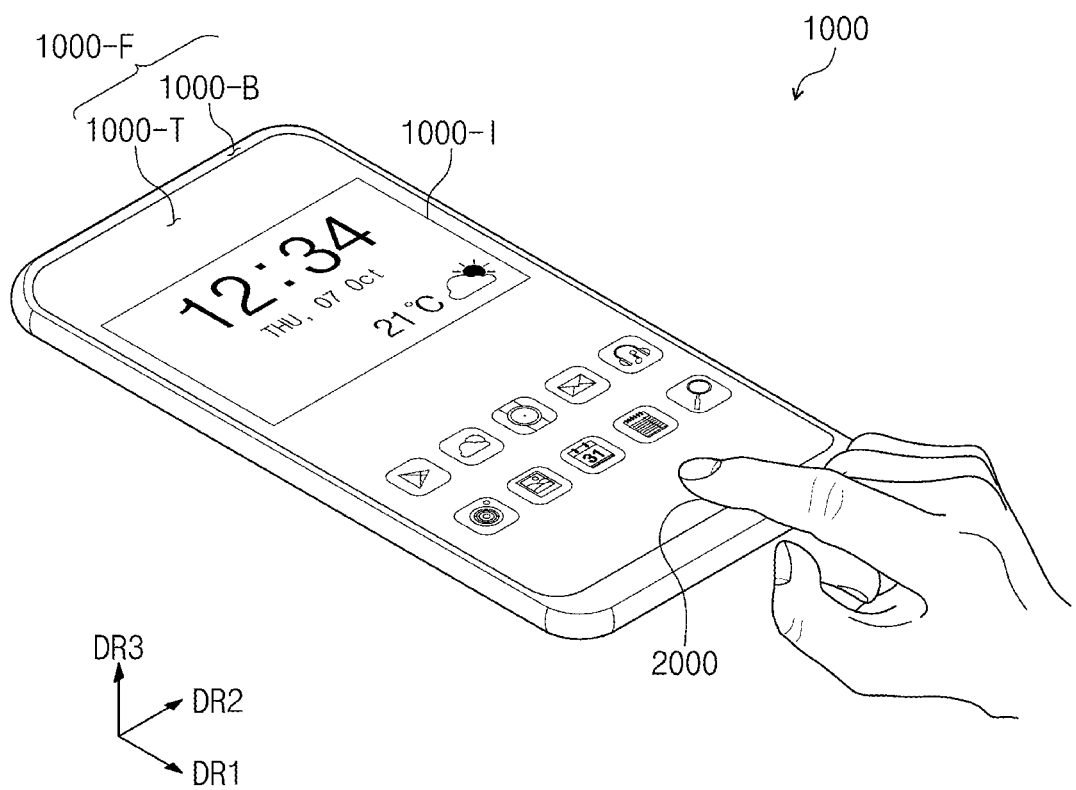
FIG. 1 is a perspective view of an electronic device according to an embodiment of the present invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Below, embodiments of the present invention will be described with reference to accompanying drawings.

Figure 2:
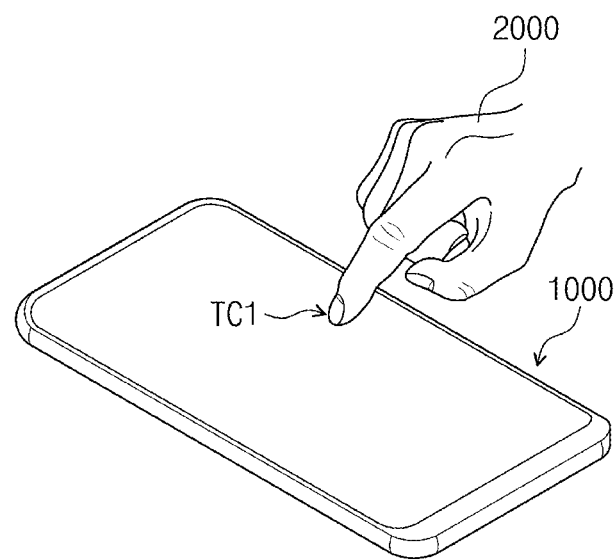
FIG. 2 is a perspective view illustrating an operation of an electronic device according to an embodiment of the present invention.

FIG. 1 is a perspective view of an electronic device according to an embodiment of the present invention, and FIG. 2 is a perspective view of an operation of an electronic device according to an embodiment of the present invention.

Referring to FIGS. 1 and 2, an electronic device 1000 may be a device that is activated depending on an electrical signal. The electronic device 1000 may include various embodiments. For example, the electronic device 1000 may be used for small and medium electronic devices such as a personal computer, a notebook computer, a personal digital terminal, an automotive navigation unit, a game console, a portable electronic device, and a camera, as well as a large electronic device such as a television, a monitor, or an outer billboard. The above are provided only as examples, and it is obvious that the electronic device 1000 may be applied to any other electronic device(s) without departing from the scope and spirit of the inventive concepts. In this embodiment, an example is illustrated in which the electronic device 1000 is a smartphone.

The electronic device 1000 may display an image 1000-I on a display surface 1000-F, which is parallel to each of a first direction DR1 and a second direction DR2 intersecting the first direction DR1, so as to face a third direction DR3. The third direction DR3 may be referred to as a "thickness direction". The image 1000-I may include a still image as well as a moving image. In FIG. 1, a clock window and icons are illustrated as an example of the image 1000-I. The display surface 1000-F on which the image 1000-I is displayed may correspond to a front surface of the electronic device 1000.

In this embodiment, a front surface (or an upper/top surface) and a rear surface (or a lower/bottom surface) of each member may be defined with respect to a direction in which the image 1000-I is displayed. The front surface and the rear surface may be opposite to each other in the third direction DR3, and a normal direction of each of the front surface and the rear surface may be parallel to the third direction DR3. In the specification, "when viewed from above a plane" may mean "when viewed in the third direction DR3".

The electronic device 1000 according to an embodiment of the present invention may detect an input of a user, which is applied from the outside. For example, the electronic device 1000 may sense a body 2000 of the user, which is applied to the outside. The input of the user may include various types of external inputs such as a part of the body of the user, a light, a heat, and a pressure. Also, the electronic device 1000 may detect an input applied to a side surface or the rear surface of the electronic device 1000 depending on a structure of the electronic device 1000, and is not limited to any one embodiment.

The electronic device 1000 may detect a first input TC1 applied from the outside. The first input TC1 may be an input that is made in a proximity sensing state, that is, a hovering state in which various types of external inputs such as a part of the body 2000 of the user, a light, a heat, and a pressure are spaced from the electronic device 1000. Also, the first input TC1 may include information (e.g., a hovering input or whether a large-area conductor comes close) about whether there is detected an input by an input device (e.g., a stylus pen, an active pen, a touch pen, an electronic pen, or an E-pen), as well as the hand of the user. In this embodiment, an example in which the first input TC1 is a hovering input by the hand of the user is described, but the present disclosure is not limited thereto. For example, as described above, the first input TC1 may be provided in various types. Also, the electronic device 1000 may detect the first input TC1 applied to the side surface or the rear surface of the electronic device 1000 depending on a structure of the electronic device 1000, and is not limited to any one embodiment. The electronic device 1000 may obtain location information (e.g., coordinate information) of the first input TC1.

However, this is only an example, and the first input TC1 according to an embodiment of the present invention is not limited thereto. The first input TC1 may be a touch input by a body (e.g., a face, a forearm, a calf, or a thigh). The electronic device 1000 may detect the first input TC1 applied to the side surface or the rear surface of the electronic device 1000 depending on a structure of the electronic device 1000. The electronic device 1000 may measure biometric information of the user through the first input TC1. The biometric information may include a muscle mass, a body fat mass, a body water content, a protein amount, an inorganic mass, a blood pressure, and a skin moisture content hydration of the user.

Figure 3:
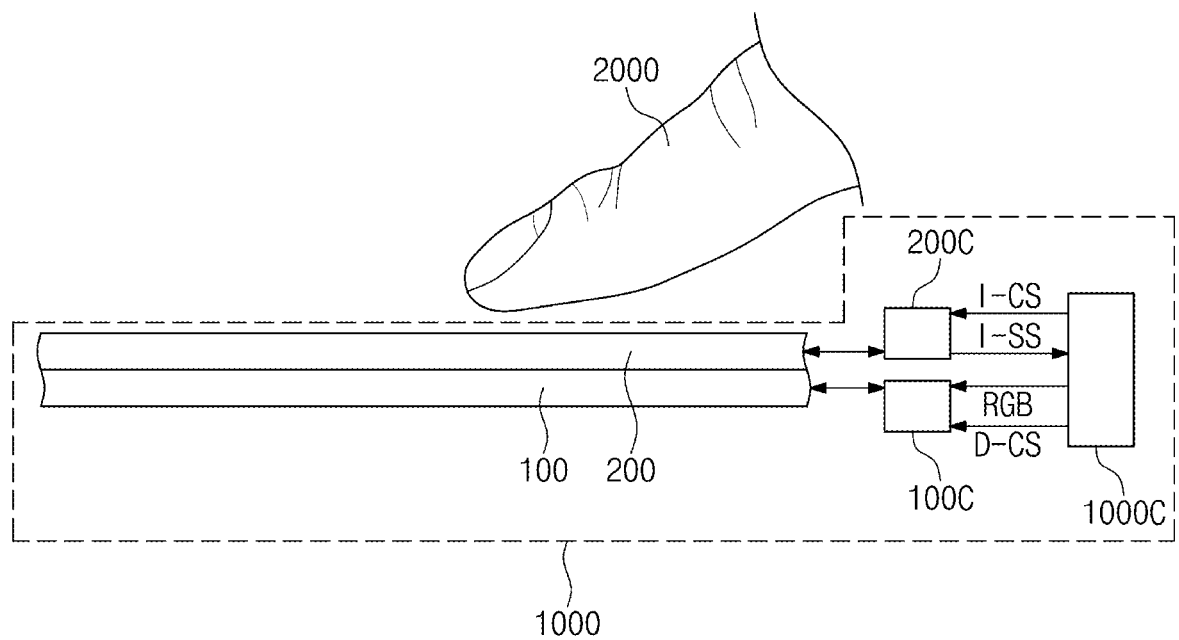
FIG. 3 is a block diagram illustrating an electronic device according to an embodiment of the present invention.

FIG. 3 is a block diagram illustrating an electronic device according to an embodiment of the present invention.

Referring to FIG. 3, the electronic device 1000 may include a display layer 100, a sensor layer 200, a display driving unit 100C, a control unit 200C, and a main control unit 1000C.

The display layer 100 may be a component that substantially generates an image. The display layer 100 may be an emission-type display layer and is not specifically limited. For example, the display layer 100 may be an organic light-emitting display layer, a quantum dot display layer, a micro LED display layer, or a nano LED display layer. An emission layer of the organic light-emitting display layer may include an organic light-emitting material. An emission layer of the quantum dot display may include a quantum dot, a quantum rod, or the like. An emission layer of the micro LED display layer may include a micro LED. An emission layer of the nano LED display layer may include a nano LED.

The sensor layer 200 may be disposed on the display layer 100. The sensor layer 200 may detect an external input that is applied from the outside. The sensor layer 200 may operate in a first mode or a second mode. The first mode may make it possible to detect whether the body 2000 of the user comes close. The first mode may be a proximity recognition mode. The second mode may make it possible to sense an input by a touch of the body 2000 of the user.

The main control unit 1000C may control an overall operation of the electronic device 1000. For example, the main control unit 1000C may control operations of the display driving unit 100C and the control unit 200C. The main control unit 1000C may include at least one microprocessor, and the main control unit 1000C may be referred to as a "host".

The display driving unit 100C may control the display layer 100. The main control unit 1000C may further include a graphics controller. The display driving unit 100C may receive image data RGB and a control signal D-CS from the main control unit 1000C. The control signal D-CS may include various signals. For example, the control signal D-CS may include an input vertical synchronization signal, an input horizontal synchronization signal, a main clock, a data enable signal, and the like. The display driving unit 100C may generate a vertical synchronization signal and a horizontal synchronization signal for controlling a timing to provide a signal to the display layer 100, based on the control signal D-CS.

The control unit 200C may control the sensor layer 200. The control unit 200C may receive a control signal I-CS from the main control unit 1000C. The control signal I-CS may include a mode determining signal determining a driving mode of the control unit 200C, and a clock signal. The control unit 200C may operate in a first mode of detecting a first input by proximity sensing or a second mode of detecting a second input by a touch, based on the control signal I-CS. The control unit 200C may allow the sensor layer 200 to operate in the first mode or the second mode, based on the mode determining signal.

The control unit 200C may calculate coordinate information of a second input TC2 (refer to FIG. 11) based on a signal received from the sensor layer 200 and may provide the main control unit 1000C with a coordinate signal I-SS including the coordinate information. The main control unit 1000C may perform an operation corresponding to the input of the user, based on the coordinate signal I-SS. For example, the main control unit 1000C may control the display driving unit 100C based on the coordinate signal I-SS such that a new application image is displayed on the display layer 100.

Figure 4A:
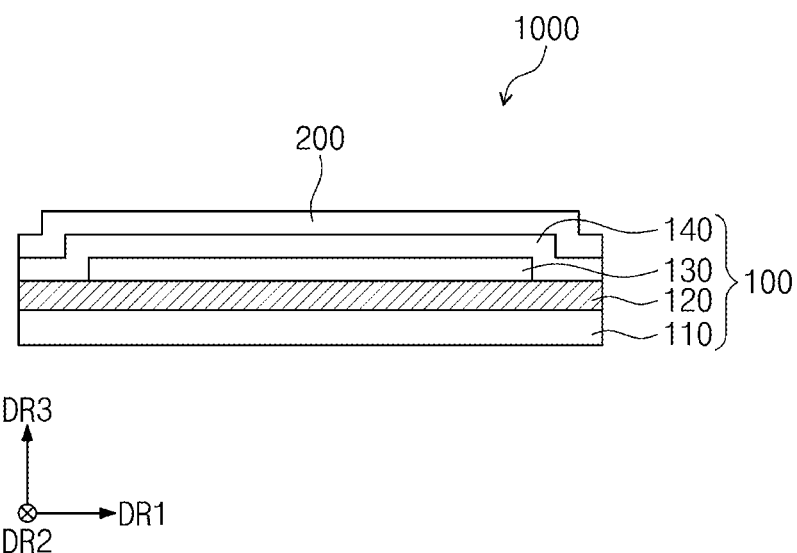
FIG. 4A is a cross-sectional view of an electronic device according to an embodiment of the present invention.

FIG. 4A is a cross-sectional view of an electronic device according to an embodiment of the present invention.

Referring to FIG. 4A, the electronic device 1000 may include the display layer 100 and the sensor layer 200. The display layer 100 may include a base layer 110, a circuit layer 120, a light-emitting element layer 130, and an encapsulation layer 140.

The base layer 110 may be a member that provides a surface on which the circuit layer 120 is disposed. The base layer 110 may be a glass substrate, a metal substrate, or a polymer substrate. However, is the inventive concepts are not limited thereto, and the base layer 110 may be an inorganic layer, an organic layer, or a composite material layer.

The base layer 110 may have a multilayered structure. For example, the base layer 110 may include a first synthetic resin layer, a silicon oxide (SiO$_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be collectively referred to as a "base barrier layer".

Each of the first and second synthetic resin layers may include a polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. The wording "~~-based resin" in the specification indicates that "~~-based resin" includes the functional group of "~~".

The circuit layer 120 may be disposed on the base layer 110. The circuit layer 120 may include an insulating layer, a semiconductor pattern, a conductive pattern, a signal line, and the like. An insulating layer, a semiconductor layer, and a conductive layer may be formed on the base layer 110 through a coating or deposition process, and the insulating layer, the semiconductor layer, and the conductive layer may be selectively patterned through a plurality of photolithography processes. Afterwards, the semiconductor pattern, the conductive pattern, and the signal line included in the circuit layer 120 may be formed.

The light-emitting element layer 130 may be disposed on the circuit layer 120. The light-emitting element layer 130 may include a light-emitting element. For example, the light-emitting element layer 130 may be an organic light-emitting material, a quantum dot, a quantum rod, a micro LED, or a nano LED.

The encapsulation layer 140 may be disposed on the light-emitting element layer 130. The encapsulation layer 140 may protect the light-emitting element layer 130 from foreign substances such as moisture, oxygen, and dust particles.

The sensor layer 200 may be formed on the display layer 100 through a sequential process. In this case, the expression "the sensor layer 200 is directly disposed on the display layer 100" may be possible. Here, "directly disposed" may mean that a third component is not interposed between the sensor layer 200 and the display layer 100. That is, a separate adhesive member may not be interposed between the sensor layer 200 and the display layer 100. Alternatively, the sensor layer 200 may be coupled to the display layer 100 through an adhesive member. The adhesive member may include a typical adhesive or sticking agent.

Figure 4B:
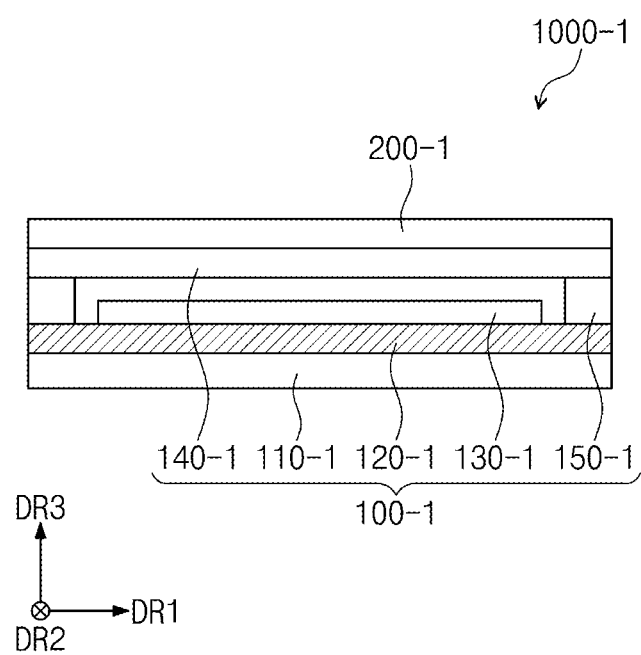
FIG. 4B is a cross-sectional view of an electronic device according to an embodiment of the present invention.

FIG. 4B is a cross-sectional view of an electronic device according to an embodiment of the present invention.

Referring to FIG. 4B, an electronic device 1000-1 may include a display layer 100-1 and a sensor layer 200-1. The display layer 100-1 may include a base substrate 110-1, a circuit layer 120-1, a light-emitting element layer 130-1, an encapsulation substrate 140-1, and a coupling member 150-1.

Each of the base substrate 110-1 and the encapsulation substrate 140-1 may be a glass substrate, a metal substrate, or a polymer substrate, but is not specifically limited thereto.

The coupling member 150-1 may be interposed between the base substrate 110-1 and the encapsulation substrate 140-1. The coupling member 150-1 may couple the encapsulation substrate 140-1 to the base substrate 110-1 or the circuit layer 120-1. The coupling member 150-1 may include an inorganic material or an organic material. For example, the inorganic material may include a frit seal, and the organic material may include a photo-curable material or a photo-plastic resin. However, a material constituting the coupling member 150-1 is not limited to the above example.

The sensor layer 200-1 may be directly disposed on the encapsulation substrate 140-1. Here, "directly disposed" may mean that a third component is not interposed between the sensor layer 200-1 and the encapsulation substrate 140-1. That is, a separate adhesive member may not be interposed between the sensor layer 200-1 and the display layer 100-1. However, the present disclosure is not limited thereto. For example, an adhesive layer may be further interposed between the sensor layer 200-1 and the encapsulation substrate 140-1.

Figure 5:
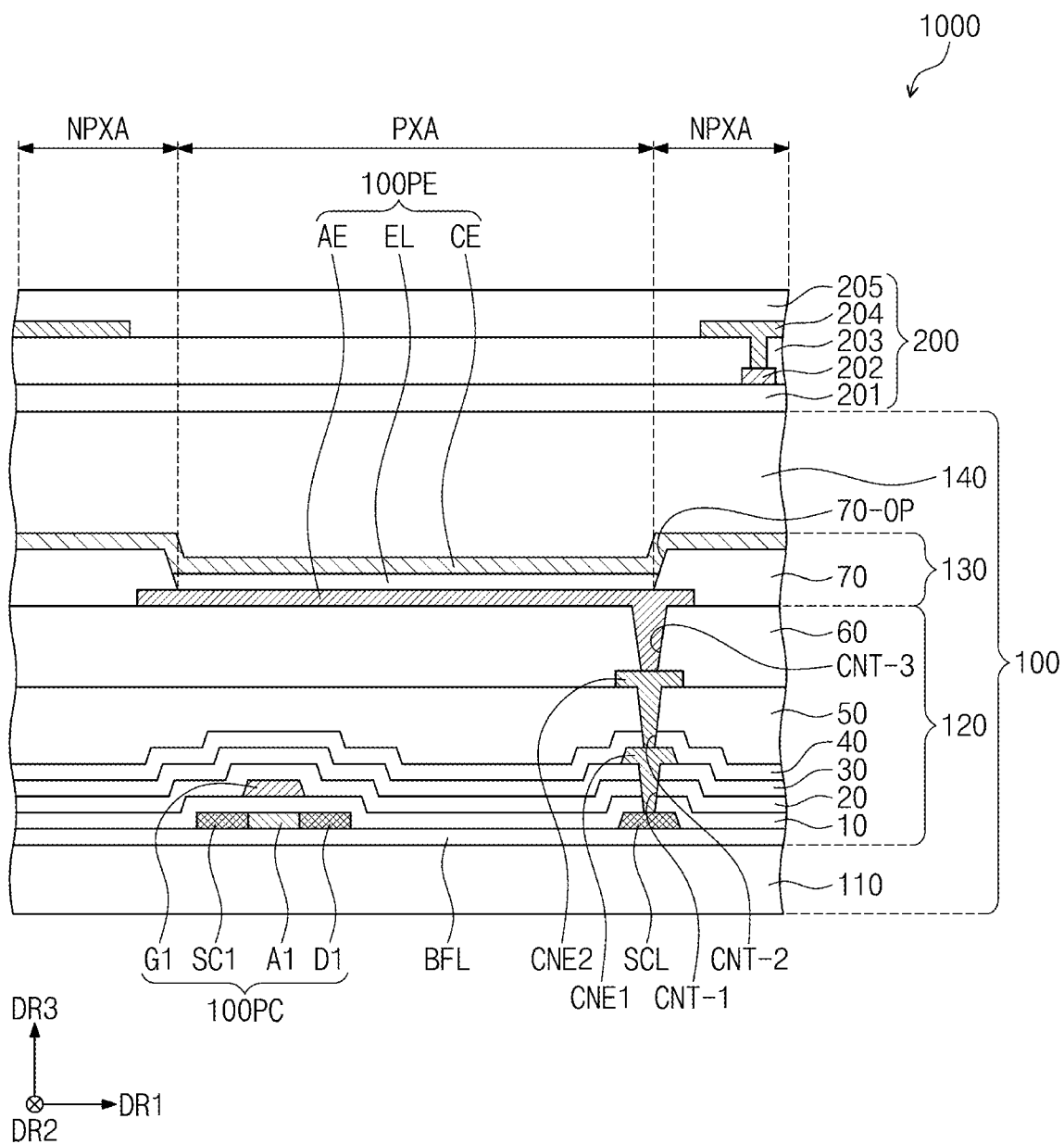
FIG. 5 is a cross-sectional view of an electronic device according to an embodiment of the present invention.

FIG. 5 is a cross-sectional view of an electronic device according to an embodiment of the present invention. In the description of FIG. 5, the components that are described with reference to FIG. 4A are marked by the same reference numerals, and thus, additional description will be omitted to avoid redundancy.

Referring to FIG. 5, at least one inorganic layer may be formed on an upper surface of the base layer 110. The inorganic layer may include at least one of aluminum oxide, titanium oxide, silicon oxide, silicon oxynitride, zirconium oxide, and hafnium oxide. The inorganic layer may be formed of multiple layers. The multiple inorganic layers may constitute a barrier layer and/or a buffer layer. In this embodiment, the display layer 100 is illustrated as including a buffer layer BFL.

The buffer layer BFL may improve a bonding force between the base layer 110 and a semiconductor pattern. The buffer layer BFL may include a silicon oxide layer and a silicon nitride layer, and the silicon oxide layer and the silicon nitride layer may be alternately stacked.

The semiconductor pattern may be disposed on the buffer layer BFL. The semiconductor pattern may include polysilicon. However, the inventive concepts are not limited thereto, and the semiconductor pattern may include amorphous silicon, low-temperature polycrystalline silicon, or an oxide semiconductor.

FIG. 5 shows only a portion of the semiconductor pattern, and the semiconductor pattern may be further disposed in any other region. Semiconductor patterns may be arranged across pixels according to a specific rule. An electrical property of the semiconductor pattern may vary depending on whether or not it is doped. The semiconductor pattern may include a first area having higher conductivity and a second area having lower conductivity. The first area may be doped with an N-type dopant or a P-type dopant. A P-type transistor may include a doping region doped with a P-type dopant, and an N-type transistor may include a doping region doped with an N-type dopant. The second region may be an undoped region or may be doped at a low concentration compared to the first region.

The conductivity of the first region may be greater than that of the second region and may substantially serve as an electrode or a signal line. The second area may correspond to an active (or channel) of a transistor substantially. In other words, a part of the semiconductor pattern may be an active of a transistor, another part thereof may be a source or a drain of the transistor, and another part may be a connection electrode or a connection signal line.

Each of pixels may have an equivalent circuit including 7 transistors, one capacitor, and a light-emitting element, and the equivalent circuit of the pixel may be modified in various forms. One transistor 100PC and one light-emitting element 100PE that are included in one pixel are illustrated in FIG. 5 as an example.

The transistor 100PC may include a source SC1, an active A1, a drain D1, and a gate G1. The source SC1, the active A1, and the drain D1 may be formed from the semiconductor pattern. In a cross-sectional view, the source SC1 and the drain D1 may extend from the active A1 in opposite directions. A part of a connection signal line SCL formed from the semiconductor pattern is illustrated in FIG. 5. Although not illustrated separately, the connection signal line SCL may be electrically connected with the drain D1 of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single-layer or multilayer structure. The first insulating layer 10 may include at least one of an aluminum oxide, a titanium oxide, a silicon oxide, a silicon nitride, a silicon oxynitride, a zirconium oxide, and a hafnium oxide. In this embodiment, the first insulating layer 10 may be a single silicon oxide layer. As well as the first insulating layer 10, an insulating layer of the circuit layer 120 (to be described later) may be an inorganic layer and/or an organic layer, and may have a single-layer or multilayer structure. The inorganic layer may include at least one of the materials described above but is not limited thereto.

The gate G1 is disposed on the first insulating layer 10. The gate G1 may be a part of a metal pattern. The gate G1 overlaps the active A1. The gate G1 may function as a mask in the process of doping the semiconductor pattern.

A second insulating layer 20 may be disposed on the first insulating layer 10 and may cover the gate G1. The second insulating layer 20 may overlap the pixels in common. The second insulating layer 20 may be an inorganic layer and/or an organic layer, and may have a single-layer structure or a multilayer structure. The second insulating layer 20 may include at least one of silicon oxide, silicon nitride, and silicon oxynitride. In this embodiment, the second insulating layer 20 may have a multilayer structure including a silicon oxide layer and a silicon nitride layer.

A third insulating layer 30 may be disposed on the second insulating layer 20. The third insulating layer 30 may have a single-layer or multilayer structure. For example, the third insulating layer 30 may have a multilayer structure including a silicon oxide layer and a silicon nitride layer.

A first connection electrode CNE1 may be disposed on the third insulating layer 30. The first connection electrode CNE1 may be connected with the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected with the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light-emitting element layer 130 may be disposed on the circuit layer 120. The light-emitting element layer 130 may include the light-emitting element 100PE. For example, the light-emitting element layer 130 may be an organic light-emitting material, a quantum dot, a quantum rod, a micro LED, or a nano LED. Below, an example in which the light-emitting element 100PE is an organic light-emitting element will be described, but the light-emitting element 100PE not specifically limited thereto.

The light-emitting element 100PE includes a first electrode AE, an emission layer EL, and a second electrode CE. The first electrode AE may be disposed on the sixth insulating layer 60. The first electrode AE may be connected with the second connection electrode CNE2 through a contact hole CNT-3 penetrating the sixth insulating layer 60.

A pixel defining layer 70 may be disposed on the sixth insulating layer 60 and may cover a part of the first electrode AE. An opening 70-OP is defined in the pixel defining layer 70. The opening 70-OP of the pixel defining layer 70 exposes at least a part of the first electrode AE.

The active area 1000-T (see FIG. 1A) may include an emission area PXA and a non-emission area NPXA adjacent to the emission area PXA. The non-emission area NPXA may surround the emission area PXA. In this embodiment, the emission area PXA is defined to correspond to a partial area of the first electrode AE, which is exposed by the opening 70-OP.

The emission layer EL may be disposed on the first electrode AE. The emission layer EL may be disposed in an area defined by the opening 70-OP. That is, the emission layer EL may be independently disposed for each pixel. In the case where the emission layers EL are independently disposed for each pixel, each of the emission layers EL may emit a light of at least one of a blue color, a red color, and a green color. However, the inventive concepts are not limited thereto. For example, the emission layer EL may be provided to be connected in common with the pixels. In this case, the emission layer EL may provide a blue color or may provide a white color.

The second electrode CE may be disposed on the emission layer EL. The second electrode CE may be in the shape of integration and may be disposed in common at a plurality of pixels.

Although not illustrated, a hole control layer may be interposed between the first electrode AE and the emission layer EL. The hole control layer may be disposed in common in the emission area PXA and the non-emission area NPXA. The hole control layer may include a hole transport layer and may further include a hole injection layer. An electron control layer may be interposed between the emission layer EL and the second electrode CE. The electron control layer may include an electron transport layer and may further include an electron injection layer. The hole control layer and the electron control layer may be formed, in common, in a plurality of pixels by using an open mask.

The encapsulation layer 140 may be disposed on the light-emitting element layer 130. The encapsulation layer 140 may include an inorganic layer, an organic layer, and an inorganic layer sequentially stacked, and layers constituting the encapsulation layer 140 are not limited thereto.

The inorganic layers may protect the light-emitting element layer 130 from moisture and oxygen, and the organic layer may protect the light-emitting element layer 130 from a foreign material, such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer but is not limited thereto.

The sensor layer 200 may be formed on the display layer 100 through a sequential process. In this case, the expression "the sensor layer 200 is directly disposed on the display layer 100" may be possible. Here, "directly disposed" may mean that a third component is not interposed between the sensor layer 200 and the display layer 100. That is, a separate adhesive member may not be interposed between the sensor layer 200 and the display layer 100. Alternatively, the sensor layer 200 may be coupled to the display layer 100 through an adhesive member. The adhesive member may include a typical adhesive or sticking agent.

The sensor layer 200 may include a base insulating layer 201, a first conductive layer 202, a sensing insulating layer 203, a second conductive layer 204, and a cover insulating layer 205.

The base insulating layer 201 may be an inorganic layer including at least one of silicon nitride, silicon oxynitride, and silicon oxide. Alternatively, the base insulating layer 201 may be an organic layer including an epoxy resin, an acrylic resin, or an imide-based resin. The base insulating layer 201 may have a single-layer structure or may be a multilayer structure in which a plurality of layers are stacked along the third direction DR3.

Each of the first conductive layer 202 and the second conductive layer 204 may have a single-layer structure or may have a multilayer structure in which a plurality of layers are stacked along the third direction DR3.

The conductive layer of the single-layer structure may include a metal layer or a transparent conductive layer. The metal layer may include molybdenum, silver, titanium, copper, aluminum, or an alloy thereof. The transparent conductive layer may include transparent conductive oxide, such as indium tin oxide (ITO), indium zinc oxide (IZO), zinc oxide (ZnO), or indium zinc tin oxide (IZTO). In addition, the transparent conductive layer may include a conductive polymer, such as PEDOT, metal nanowire, or graphene.

The conductive layer of the multilayer structure may include metal layers. The metal layers may have, for example, a three-layer structure of titanium/aluminum/titanium. The conductive layer of the multilayer structure may include at least one metal layer and at least one transparent conductive layer.

At least one of the sensing insulating layer 203 and the cover insulating layer 205 may include an inorganic layer. The inorganic layer may include at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic film may include at least one of an acrylic-based resin, a methacrylic-based resin, a polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 6:
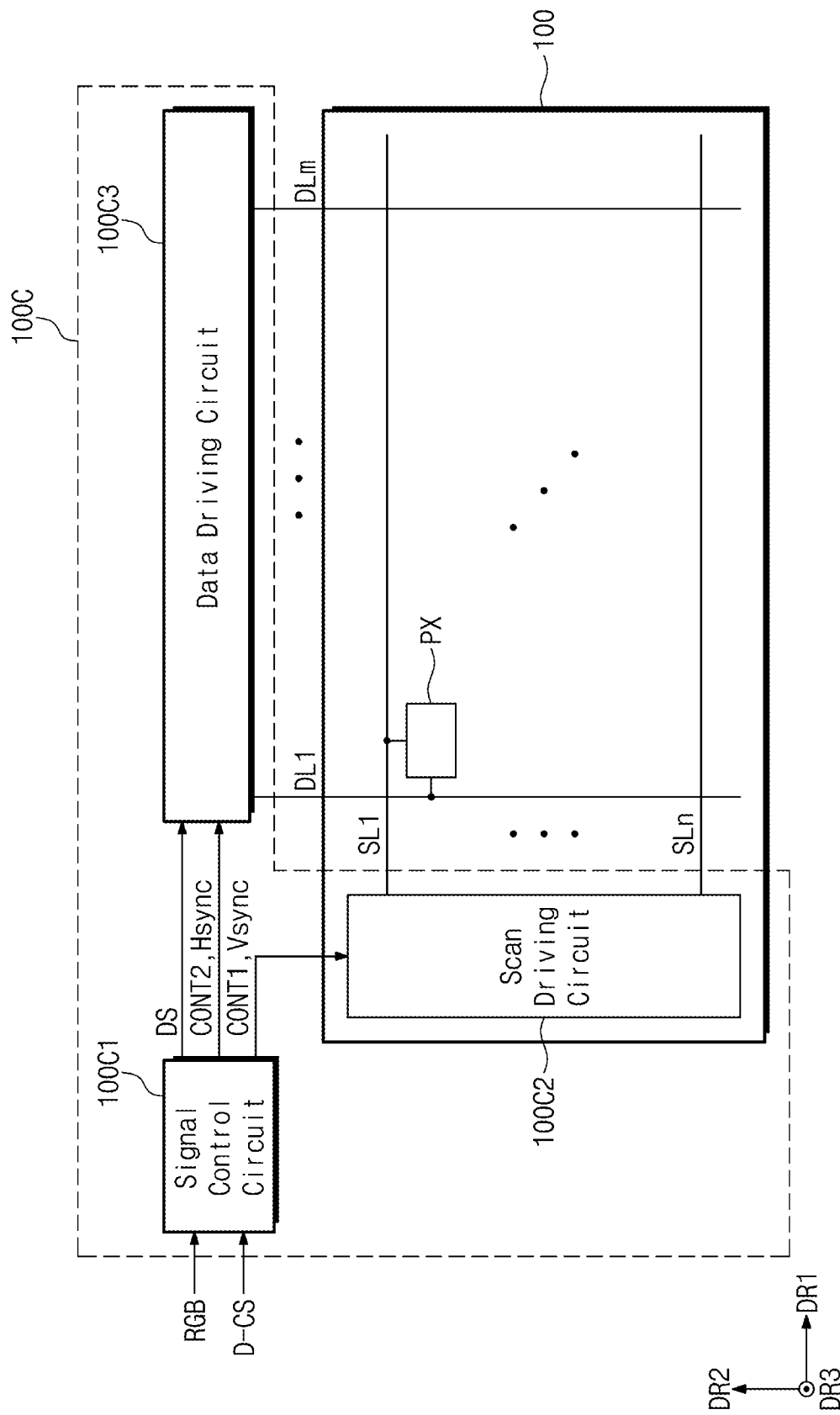
FIG. 6 is a block diagram of a display layer and a display driving unit according to an embodiment of the present invention.

FIG. 6 is a block diagram of a display layer and a display driving unit according to an embodiment of the present invention.

Referring to FIG. 6, the display layer 100 may include a plurality of scan lines SL1 to SLn, a plurality of data lines DL1 to DLm, and a plurality of pixels PX. Each of the plurality of pixels PX may be connected with a corresponding data line of the plurality of data lines DL1 to DLm and may be connected with a corresponding scan line of the plurality of scan lines SL1 to SLn. In an embodiment of the present invention, the display layer 100 may further include emission control lines, and the display driving unit 100C may further include an emission driving circuit that provides control signals to the emission control lines. A configuration of the display layer 100 is not specifically limited.

The display driving unit 100C may include a signal control circuit 100C1, a scan driving circuit 100C2, and a data driving circuit 100C3.

The signal control circuit 100C1 may receive the image data RGB and the control signal D-CS from the main control unit 1000C (refer to FIG. 3). The control signal D-CS may include various signals. For example, the control signal D-CS may include an input vertical synchronization signal, an input horizontal synchronization signal, a main clock, a data enable signal, and the like.

The signal control circuit 100C1 may generate a first control signal CONT1 and a vertical synchronization signal Vsync based on the control signal D-CS and may output the first control signal CONT1 and the vertical synchronization signal Vsync to the scan driving circuit 100C2. In an embodiment, the vertical synchronization signal Vsync may be included in the first control signal CONT1.

The signal control circuit 100C1 may generate a second control signal CONT2 and a horizontal synchronization signal Hsync based on the control signal D-CS, and the horizontal synchronization signal Hsync may be included in the second control signal CONT2.

Also, the signal control circuit 100C1 may output a data signal DS, which is obtained by processing the image data RGB so as to be appropriate for an operating condition of the display layer 100, to the data driving circuit 100C3. The first control signal CONT1 and the second control signal CONT2 that are signals necessary for operations of the scan driving circuit 100C2 and the data driving circuit 100C3 are not specifically limited.

The scan driving circuit 100C2 may drive the plurality of scan lines SL1 to SLn in response to the first control signal CONT1 and the vertical synchronization signal Vsync. In an embodiment of the present invention, the scan driving circuit 100C2 may be formed in the same process as the circuit layer 120 (refer to FIG. 5) in the display layer 100, but the inventive concepts are not limited thereto. For example, the scan driving circuit 100C2 may be implemented with an integrated circuit (IC); for electrical connection with the display layer 100, the integrated circuit may be directly mounted in a given area of the display layer 100 or may be mounted on a separate printed circuit board in a chip on film (COF) manner.

The data driving circuit 100C3 may output gray scale voltages for driving the plurality of data lines DL1 to DLm in response to the second control signal CONT2, the horizontal synchronization signal Hsync, and the data signal DS from the signal control circuit 100C1. The data driving circuit 100C3 may be implemented with an integrated circuit; for electrical connection with the display layer 100, the integrated circuit may be directly mounted in a given area of the display layer 100 or may be mounted on a separate printed circuit board in a chip on film manner. For example, the data driving circuit 100C3 may be formed in the same process as the circuit layer 120 (refer to FIG. 5) in the display layer 100.

Figure 7:
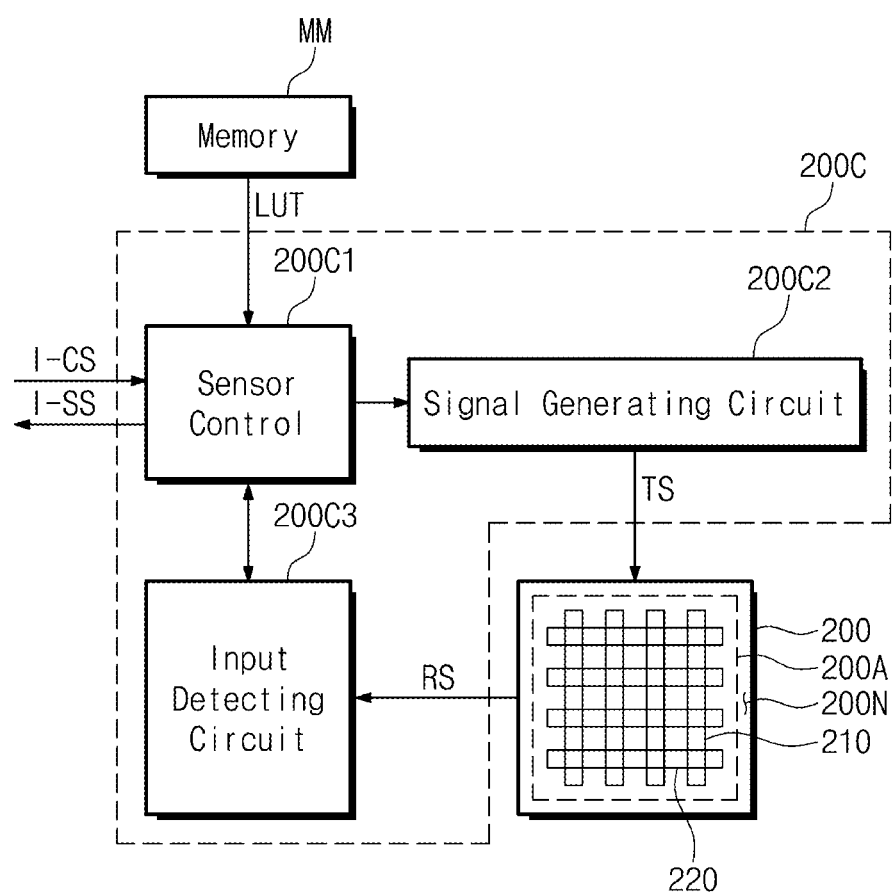
FIG. 7 is a block diagram of a sensor layer and a control unit according to an embodiment of the present invention.

FIG. 7 is a block diagram of a sensor layer and a control unit according to an embodiment of the present invention.

Referring to FIG. 7, an active area 200A and a peripheral area 200N may be defined in the sensor layer 200. The active area 200A may be an area that is activated depending on an electrical signal. For example, the active area 200A may be an area in which an input is sensed (or detected).

The sensor layer 200 may include a plurality of first electrodes 210 and a plurality of second electrodes 220.

Each of the plurality of first electrodes 210 may extend in the first direction DR1, and the plurality of first electrodes 210 may be arranged to be spaced from each other in the second direction DR2. Each of the plurality of second electrodes 220 may extend in the second direction DR2, and the plurality of second electrodes 220 may be arranged to be spaced from each other in the first direction DR1. The plurality of first electrodes 210 and the plurality of second electrodes 220 may be insulated from each other and may cross each other.

The control unit 200C may be electrically connected with the sensor layer 200. The control unit 200C may control the sensor layer 200. The control unit 200C may receive the control signal I-CS from the main control unit 1000C (refer to FIG. 3) and may output the coordinate signal I-SS to the main control unit 1000C.

The control unit 200C may include a sensor control circuit 200C1, a signal generating circuit 200C2, and an input detecting circuit 200C3. The sensor control circuit 200C1, the signal generating circuit 200C2, and the input detecting circuit 200C3 may be implemented in a single chip; alternatively, the sensor control circuit 200C1, the signal generating circuit 200C2, and the input detecting circuit 200C3 may be classified into a first part and a second part, and the first part and the second part may be implemented with different chips.

The sensor control circuit 200C1 may control the operation of the signal generating circuit 200C2; the sensor control circuit 200C1 may calculate coordinates of an external input from a signal received from the input detecting circuit 200C3 or may measure a hovering from another signal received from the input detecting circuit 200C3. Alternatively, the sensor control circuit 200C1 may measure biometric information of the body from another signal received from the input detecting circuit 200C3. The signal generating circuit 200C2 may provide the sensor layer 200 with a first touch signal TS (or a driving signal) called a "TX signal". The signal generating circuit 200C2 may output an output signal complying with an operating mode to the sensor layer 200.

The input detecting circuit 200C3 may receive an analog signal, which is a second touch signal RS (or a sensing signal) called an "RX signal", from the sensor layer 200 and may convert the analog signal into a digital signal. The input detecting circuit 200C3 may amplify the received analog signal and may filter the amplified analog signal. The input detecting circuit 200C3 may convert the filtered analog signal into a digital signal.

A memory MM may provide a lookup table LUT to the sensor control circuit 200C1. The lookup table LUT may be information by which another of the plurality of first electrodes 210 is selected to correspond to one of the plurality of first electrodes 210, in a plan view. An example in which the memory MM is separated from the control unit 200C is illustrated in FIG. 7, but the memory MM according to an embodiment of the present invention is not limited thereto. For example, the memory MM may be included in the control unit 200C.

The control unit 200C may select one of the plurality of first electrodes 210 based on the lookup table LUT. For example, the sensor control circuit 200C1 may select one of the plurality of first electrodes 210, which does not overlap the body 2000 (refer to FIG. 1), based on the lookup table LUT and may provide information about the selected electrode to the input detecting circuit 200C3.

The input detecting circuit 200C3 may reduce or cancel a noise level of the second touch signal RS thus received. This will be described later.

Figure 8:
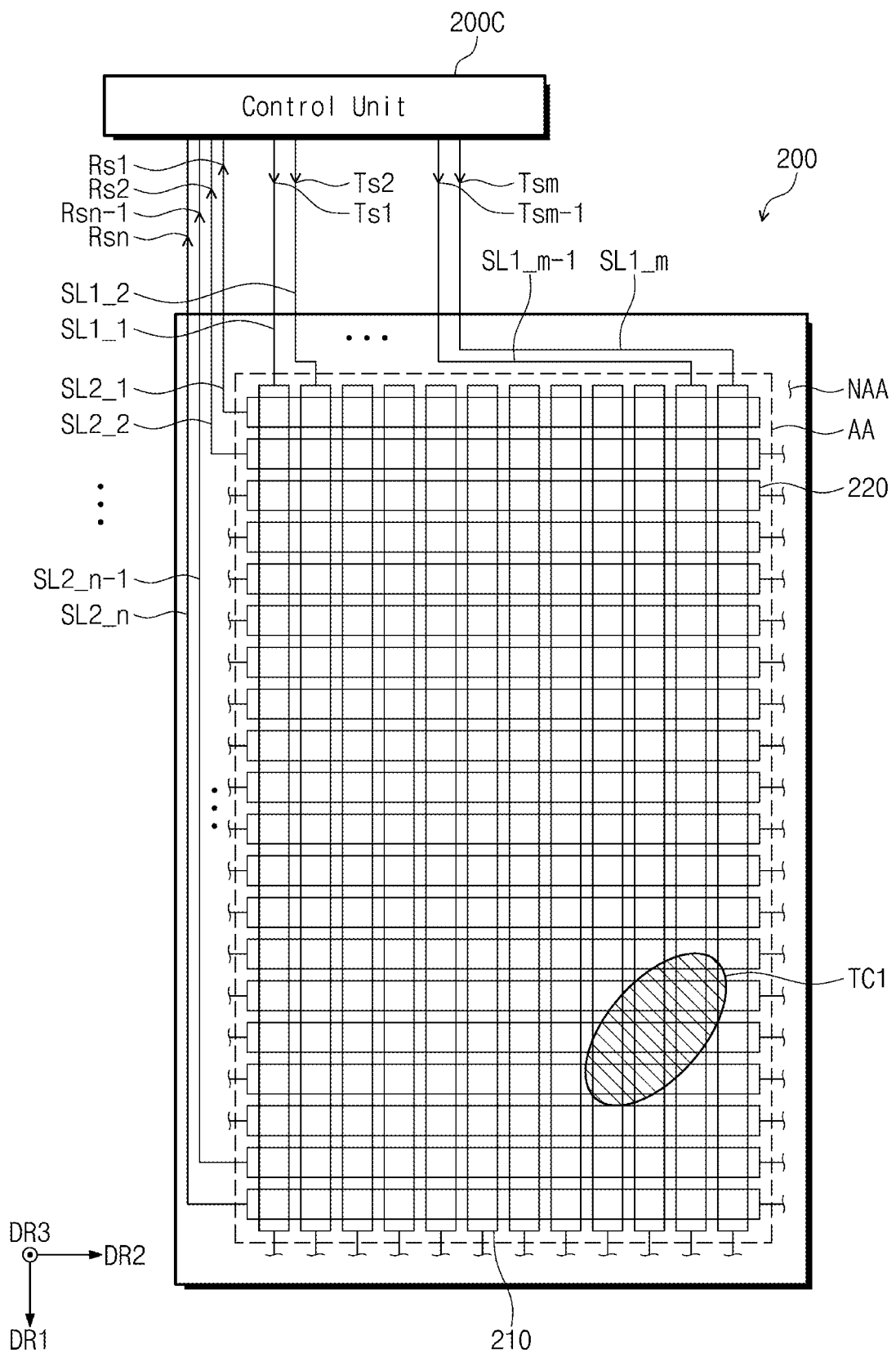
FIG. 8 is a plan view illustrating a sensor layer according to an embodiment of the present invention.

FIG. 8 is a plan view illustrating a sensor layer according to an embodiment of the present invention. In the description of FIG. 8, the components that are described with reference to FIG. 7 are marked by the same reference numerals, and thus, additional description will be omitted to avoid redundancy.

Referring to FIGS. 8 and 10, the sensor layer 200 may include the plurality of first electrodes 210, the plurality of second electrodes 220, a plurality of first lines SL1_1 to SL1_m, and a plurality of second lines SL2_1 to SL2_n.

The plurality of first lines SL1_1 to SL1_m may be electrically connected with one ends of the plurality of first electrodes 210, respectively. The plurality of second lines SL2_1 to SL2_n may be electrically connected with one ends of the plurality of second electrodes 220, respectively. However, the inventive concepts are not limited thereto. For example, the sensor layer 200 according to an embodiment of the present invention may further include a plurality of third lines that are electrically connected with opposite ends of the plurality of second electrodes 220, respectively.

The control unit 200C may be electrically connected with the sensor layer 200. The control unit 200C may be electrically connected with the plurality of first electrodes 210 and the plurality of second electrodes 220. The control unit 200C may control the first mode of detecting whether the body comes close to the sensor layer 200 and the second mode of sensing an input by a touch.

In the first mode, the control unit 200C may detect whether the body 2000 of the user comes close, based on a measurement signal to which a variation in a capacitance between the plurality of first electrodes 210 and the plurality of second electrodes 220 due to the first input TC1 is applied.

In the second mode, the control unit 200C may sense (or detect) a location of the body 2000 of the user, based on a sensing signal to which a variation in a capacitance between the plurality of first electrodes 210 and the plurality of second electrodes 220 due to the second input TC2 (refer to FIG. 11) is applied.

The variation in the capacitance may mean a change in a capacitance that occurs before and after an input by an input means, for example, the body 2000 (refer to FIG. 3) of the user.

The plurality of first electrodes 210 may be electrically connected with the control unit 200C through the plurality of first lines SL1_1 to SL1_m, and the plurality of second electrodes 220 may be electrically connected with the control unit 200C through the plurality of second lines SL2_1 to SL2_n.

The control unit 200C may transmit a plurality of first touch signals Ts1 to Tsm to the plurality of first electrodes 210 and may receive a plurality of second touch signals Rs1 to Rsn, to which a variation of a capacitance between the plurality of first electrodes 210 and the plurality of second electrodes 220 is applied, from the plurality of second electrodes 220.

The plurality of first touch signals Ts1 to Tsm may correspond to the first touch signal TS of FIG. 7, and the plurality of second touch signals Rs1 to Rsn may correspond to the second touch signal RS of FIG. 7.

The first input TC1 corresponding to the body of the user may be provided to the sensor layer 200, and the control unit 200C may detect whether the body comes close, based on the first input TC1. However, this is an example, and the control unit 200C according to an embodiment of the present invention may measure biometric information of the body based on the first input TC1.

The plurality of second electrodes 220 may include measurement electrodes and noise electrodes. A plurality of second electrodes 220 overlapping or adjacent to the first input TC1 in a plan view may be referred to as "measurement electrodes". A plurality of second electrodes 220 not overlapping the first input TC1 in a plan view may be referred to as "noise electrodes".

The control unit 200C may receive a measurement signal generated based on the measurement electrodes, and may receive a noise signal generated based on the noise electrodes. The measurement signal and the noise signal will be described later.

Figure 9:
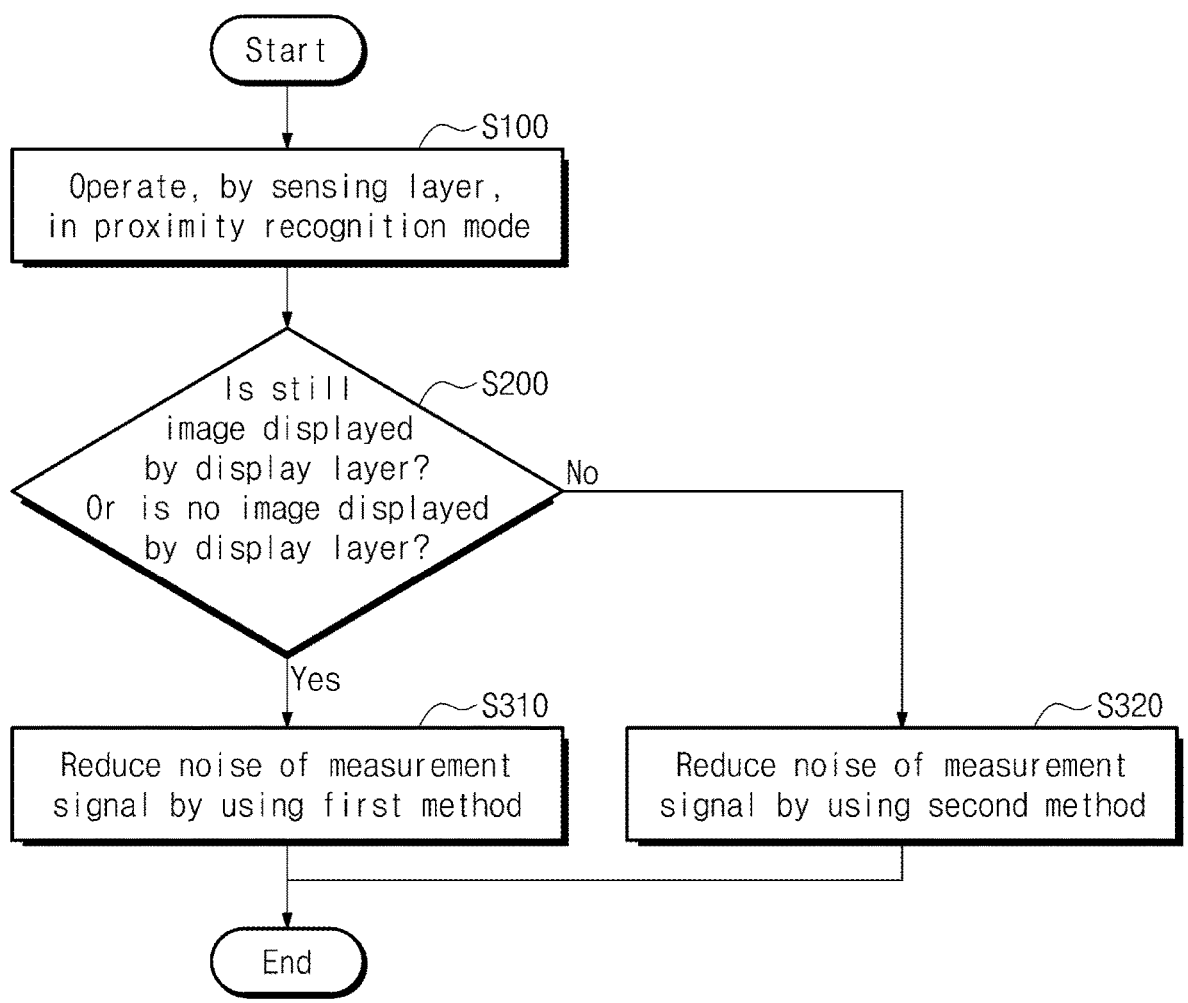
FIG. 9 is a flowchart illustrating a driving method of an electronic device according to an embodiment of the present invention.
Figure 10A:
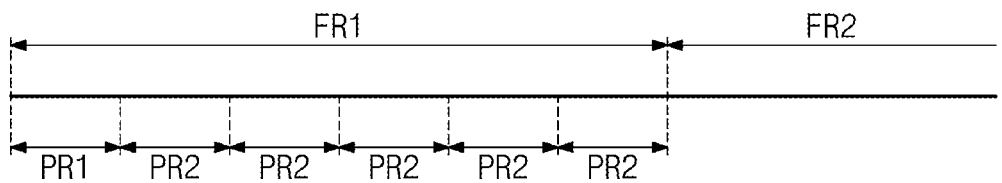
FIG. 10A and FIG. 10B are timing diagrams illustrating an operation in a first sensing mode according to an embodiment of the present invention.
Figure 10B:
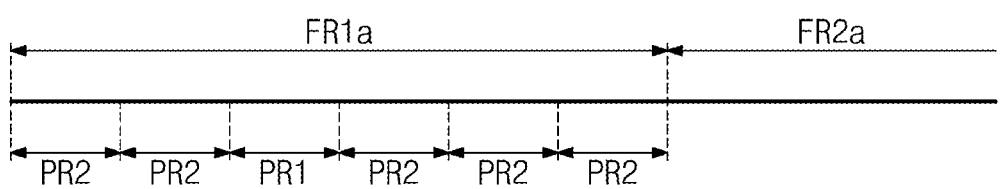
Figure 10C:
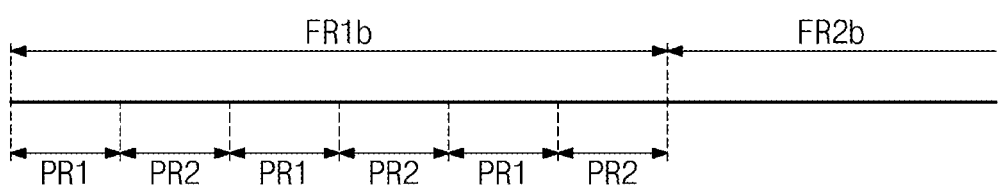
FIG. 10C, FIG. 10D, and FIG. 10E are timing diagrams illustrating an operation in a second sensing mode according to an embodiment of the present invention.
Figure 10D:
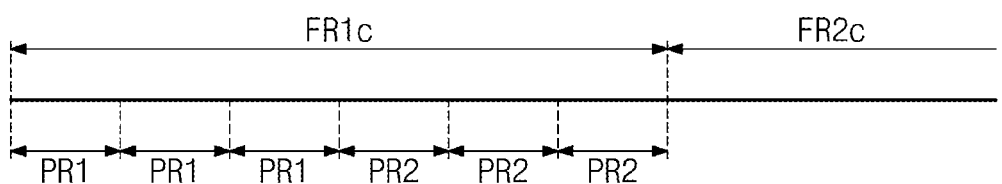
Figure 10E:
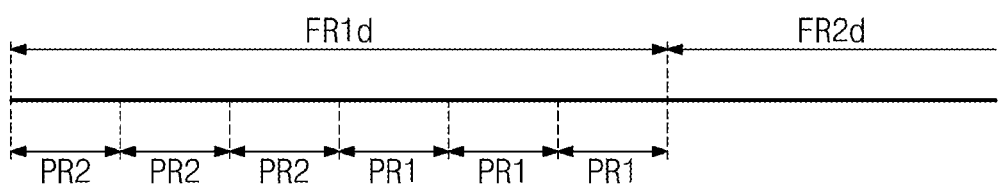

FIG. 9 is a flowchart illustrating a driving method of an electronic device according to an embodiment of the present invention, FIGS. 10A and 10B are timing diagrams illustrating an operation in a first sensing mode according to an embodiment of the present invention, and FIGS. 10C to 10E are timing diagrams illustrating an operation in a second sensing mode according to an embodiment of the present invention.

Referring to FIGS. 8 to 10E, the sensor layer 200 may operate in a proximity recognition mode (S100). The proximity recognition mode may be referred to as a "first mode". The sensor layer 200 may be driven in units of frame. Two frames are illustrated in FIGS. 10A to 10E as an example, but the inventive concepts are not limited thereto.

The display layer 100 (refer to FIG. 3) may display the image 1000-I (refer to FIG. 1) (S200). The image 1000-I may include a moving image and a still image.

When the display layer 100 (refer to FIG. 3) displays a still image or does not display the image 1000-I, the sensor layer 200 may operate in the first sensing mode.

In the case where the display layer 100 displays a still image or does not display the image 1000-I, an interference that a signal generated by the display layer 100 (refer to FIG. 3) causes against the sensor layer 200 may be small compared to the case where the display layer 100 displays a moving image. When the sensor layer 200 operates in the first sensing mode, the control unit 200C may reduce a noise level of the measurement signal by using a first method (S310). The first method may refer to a method of selecting the arrangement of a first period PR1 and a plurality of second periods PR2 within one frame or the lookup table LUT (refer to FIG. 7) to be applied. This will be described with reference to FIGS. 10A and 10B.

Referring to FIGS. 8 and 10A, the first sensing mode may include a plurality of frames. The plurality of frames may include a first frame FR1 and a second frame FR2 provided after the first frame FR1.

In the first frame FR1, the control unit 200C electrically connected with the sensor layer 200 may supply the first touch signal TS (refer to FIG. 7) to the plurality of first electrodes 210 and may receive the second touch signal RS (refer to FIG. 7) from the plurality of second electrodes 220.

The first frame FR1 may include a plurality of periods. The plurality of periods may include a first period PR1 and a plurality of second periods PR2 that are sequentially arranged. For example, the first frame FR1 may include one first period PR1 and five second periods PR2 that are consecutive. For example, in the case where a display frame driven in the display layer 100 and a frame driven in the sensor layer 200 are synchronized, a lot of noise may occur in a period in which one frame starts, compared to the remaining periods. Accordingly, as illustrated in FIG. 10A, in the case the first period PR1 proceeds first in the first frame FR1, an effect of reducing the noise may be improved. However, this is only an example, and a combination of the first period PR1 and the plurality of second periods PR2 may be variously provided without limitation thereto.

The first period PR1 may refer to a period in which differential sensing is performed, and the second period PR2 may refer to a period in which single sensing is performed. The differential sensing may provide a signal whose noise level is lower than that of the single sensing, and the single sensing may provide a signal whose magnitude is greater than that of the differential sensing. In the first sensing mode, the number of second periods PR2 may be more than the number of first periods PR1.

According to the present invention, when the display layer 100 (refer to FIG. 3) displays a still image or does not display the image 1000-I, the sensor layer 200 may operate in the first sensing mode. The first sensing mode may make it possible to adjust a ratio of the first period PR1 for reducing the noise and the second period PR2 for securing a magnitude of a signal corresponding to a result of sensing hovering. Because the noise level is not relatively great in the first sensing mode, the ratio may be set such that the number of second periods PR2 is greater than the number of first periods PR1 within one frame. In this case, the noise level may be reduced, and the magnitude of the signal may also be secured. Accordingly, the electronic device 1000 (refer to FIG. 1) in which the reliability and accuracy of proximity sensing are improved may be provided.

In the case of sensing the first input TC1 (refer to FIG. 1) in the first period PR1, the control unit 200C may obtain the measurement signal from one of the plurality of second electrodes 220 and may obtain the noise signal from another of the plurality of second electrodes 220. The control unit 200C may determine whether the first input TC1 (refer to FIG. 2) is sensed, based on the measurement signal and the noise signal.

That is, the control unit 200C may obtain the measurement signal from measurement electrodes overlapping the hovered body 2000 (refer to FIG. 3) in a plan view from among the plurality of second electrodes 220 and may obtain the noise signal from one of noise electrodes not overlapping the body 2000 (refer to FIG. 3) in a plan view from among the plurality of second electrodes 220. The control unit 200C may reduce the noise level of the measurement signal based on the measurement signal and the noise signal.

The control unit 200C may select the noise electrode corresponding to the measurement electrode based on the lookup table LUT (refer to FIG. 7) stored in the memory MINI (refer to FIG. 7). In the case of operating in the first sensing mode, the lookup table LUT may define, as the noise electrode, the second electrode 220 spaced from each of the measurement electrodes as much as a first distance. For example, in the case where the measurement electrode is the n-th second electrode 220 (n being a positive integer), the noise electrode may be the (n−10)-th second electrode 220.

Referring to FIGS. 8 and 10B, the first sensing mode may include a plurality of frames. The plurality of frames may include a first frame FR1a and a second frame FR2a provided after the first frame FR1a. In the description of FIG. 10B, the components that are described with reference to FIG. 10A are marked by the same reference numerals, and thus, additional description will be omitted to avoid redundancy.

The first frame FR1 a may include two consecutive second periods PR2, a first period PR1, and three consecutive second periods PR2.

The control unit 200C may select the noise electrode corresponding to the measurement electrode based on the lookup table LUT (refer to FIG. 7) stored in the memory MINI (refer to FIG. 7). In the case of operating in the first sensing mode, the lookup table LUT may define a fixed noise electrode for each of the measurement electrodes. For example, the noise electrode may be the i-th second electrode 220 (i being a positive integer) regardless of the measurement electrode.

When the display layer 100 (refer to FIG. 3) displays a moving image, the sensor layer 200 may operate in the second sensing mode.

In the case of a moving image, an interference that a signal generated by the display layer 100 (refer to FIG. 3) causes against the sensor layer 200 may be great compared to the case where the display layer 100 does not display the still image or the image 1000-I (refer to FIG. 1). In the case of operating in the second sensing mode, the control unit 200C may reduce a noise level of the measurement signal by using a second method (S320). The second method may refer to a method of selecting the arrangement of a plurality of first periods PR1 and a plurality of second periods PR2 within one frame or the lookup table LUT (refer to FIG. 7) to be applied. This will be described with reference to FIGS. 10C and 10E.

Referring to FIGS. 8 and 10C, the second sensing mode may include a plurality of frames. The plurality of frames may include a first frame FR1b and a second frame FR2b provided after the first frame FR1b. In the description of FIG. 10C, the components that are described with reference to FIG. 10A are marked by the same reference numerals, and thus, additional description will be omitted to avoid redundancy.

The first frame FR1b may include a plurality of first periods PR1 and a plurality of second periods PR2 that are alternately arranged in time.

The control unit 200C may select the noise electrode corresponding to the measurement electrode based on the lookup table LUT (refer to FIG. 7) stored in the memory MINI (refer to FIG. 7). In the case of operating in the second sensing mode, the lookup table LUT may define, as the noise electrode, the second electrode 220 spaced from each of the measurement electrodes as much as a second distance. The second distance may be less than the first distance between the measurement electrode and the noise electrode defined in the lookup table LUT (refer to FIG. 7) in the first sensing mode. For example, in the case where the measurement electrode is the k-th second electrode 220 (k being a positive integer), the noise electrode may be the (k−3)-th second electrode 220.

According to the present invention, when the display layer 100 (refer to FIG. 3) displays a moving image, the sensor layer 200 may operate in the second sensing mode. The second sensing mode may make it possible to adjust a ratio of the first period PR1 for reducing the noise and the second period PR2 for securing a magnitude of a signal corresponding to a result of sensing hovering. Because the noise is relatively great in the second sensing mode, the ratio may be set such that the number of second periods PR2 is less than or equal to the number of first periods PR1 within one frame. In this case, the noise level may be reduced. Accordingly, the electronic device 1000 (refer to FIG. 1) in which the reliability and accuracy of proximity sensing are improved may be provided.

Referring to FIGS. 8 and 10D, the second sensing mode may include a plurality of frames. The plurality of frames may include a first frame FR1c and a second frame FR2c provided after the first frame FR1c. In the description of FIG. 10D, the components that are described with reference to FIG. 10A are marked by the same reference numerals, and thus, additional description will be omitted to avoid redundancy.

The first frame FR1c may include three consecutive first periods PR1, and may then include three consecutive second periods PR2.

The control unit 200C may select the noise electrode corresponding to the measurement electrode based on the lookup table LUT (refer to FIG. 7) stored in the memory MINI (refer to FIG. 7). The lookup table LUT (refer to FIG. 7) may differently define a noise electrode for each of the first periods PR1. A first noise electrode may be defined in the first period PR1 placed on the leftmost, a second noise electrode different from the first noise electrode may be defined in the first period PR1 placed on the center, and a third noise electrode different from the first noise electrode and the second noise electrode may be defined in the first period PR1 placed on the rightmost. For example, the first noise electrode may be the second electrode 220 placed at the ninth position from among the plurality of second electrodes 220; the second noise electrode may be the second electrode 220 placed at the 17th position from among the plurality of second electrodes 220; and the third noise electrode may be the second electrode 220 placed at the 13th position from among the plurality of second electrodes 220.

Referring to FIGS. 8 and 10E, the second sensing mode may include a plurality of frames. The plurality of frames may include a first frame FR1d and a second frame FR2d provided after the first frame FR1d. In the description of FIG. 10E, the components that are described with reference to FIG. 10A are marked by the same reference numerals, and thus, additional description will be omitted to avoid redundancy.

The first frame FR1d may include three consecutive second periods PR2, and may then include three consecutive first periods PR1.

The control unit 200C may select the noise electrode corresponding to the measurement electrode based on the lookup table LUT (refer to FIG. 7) stored in the memory MINI (refer to FIG. 7). The lookup table LUT (refer to FIG. 7) may differently define a noise electrode for each of the first periods PR1. A first noise electrode may be defined in the first period PR1 placed on the leftmost, a second noise electrode different from the first noise electrode may be defined in the first period PR1 placed on the center, and a third noise electrode different from the first noise electrode and the second noise electrode may be defined in the first period PR1 placed on the rightmost. For example, the first noise electrode may be the second electrode 220 placed at the 15th position from among the plurality of second electrodes 220; the second noise electrode may be the second electrode 220 placed at the 12th position from among the plurality of second electrodes 220; the third noise electrode may be the second electrode 220 placed at the 16th position from among the plurality of second electrodes 220.

Figure 11:
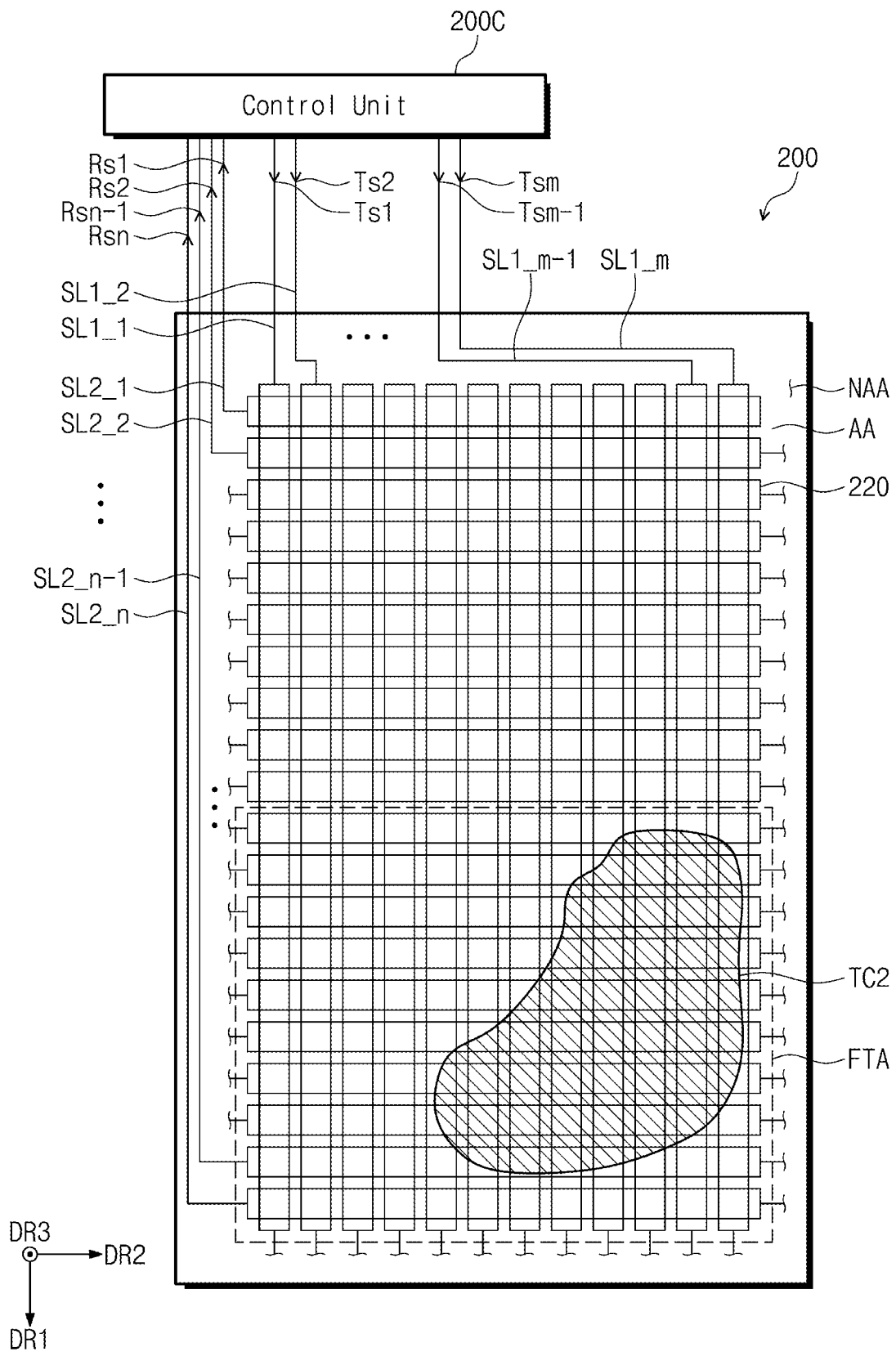
FIG. 11 is a plan view illustrating a sensor layer according to an embodiment of the present invention.

FIG. 11 is a plan view illustrating a sensor layer according to an embodiment of the present invention. In the description of FIG. 11, the components that are described with reference to FIG. 8 are marked by the same reference numerals, and thus, additional description will be omitted to avoid redundancy.

Referring to FIG. 11, the second input TC2 may be sensed in the sensor layer 200. The input part 200 may sense the first input TC1 (refer to FIG. 8) at the same time with the second input TC2.

The electronic device 1000 (refer to FIG. 1) according to an embodiment of the present invention may sense the second input TC2 applied from the outside. The second input TC2 may be one of various types of external inputs, such as a part of the body 2000 (refer to FIG. 1) of the user, a light, a heat, and a pressure, or a combination thereof. Also, the second input TC2 may include an input by an input device (e.g., a stylus pen, an active pen, a touch pen, an electronic pen, or an E-pen), as well as the hand of the user. In this embodiment, an example in which the second input TC2 is a touch input by the hand of the user is described, but the inventive concepts are not limited thereto. For example, as described above, the second input TC2 may be provided in various types. Also, the electronic device 1000 may sense the second input TC2 applied to the side surface or the rear surface of the electronic device 1000 depending on a structure of the electronic device 1000, and is not limited to one embodiment. The electronic device 1000 may obtain location information (e.g., coordinate information) of the second input TC2 in the second mode.

A plurality of lookup tables LUT (refer to FIG. 7) may be stored in the memory MM (refer to FIG. 7). The plurality of lookup tables may include a first lookup table and a second lookup table different from the first lookup table.

When the first input TC1 is sensed, the control unit 200C may obtain the measurement signal and the noise signal based on the first lookup table. When the first input TC1 and the second input TC2 are simultaneously sensed, the control unit 200C may obtain the measurement signal and the noise signal based on the second lookup table.

Unlike the present embodiment, in the case where an incorrect noise electrode is is selected in a state where the first input TC1 and the second input TC2 are simultaneously sensed, the second input TC2 may be determined to be the noise signal, thereby reducing the accuracy of the second input TC2. However, according to the present embodiment, a lookup table that is different from the lookup table LUT (refer to FIG. 7) applied when only the first input TC1 is sensed may be applied when the first input TC1 and the second input TC2 are simultaneously sensed. Only the noise signal of the second input TC2 may be easily reduced by using the applied lookup table LUT (refer to FIG. 7). Accordingly, the electronic device 1000 (refer to FIG. 1) in which the reliability and accuracy of proximity sensing are improved may be provided.

Also, a touch area FTA may be defined in an area in which the second input TC2 is applied. When the second input TC2 is sensed, the noise electrode may not overlap the touch area FTA.

Unlike the present embodiment, in the case where the noise electrode overlaps the touch area FTA, a sensing value of the second input TC2 may be abnormally recognized as the noise signal, thereby decreasing the sensing value of the second input TC2. However, according to the present embodiment, in the case where the second input TC2 is sensed, the noise signal extracted in the touch area FTA may not be used, and the noise level of the first input TC1 may be reduced by using the noise signal extracted from the remaining area other than the touch area FTA. Accordingly, the electronic device 1000 (refer to FIG. 1) in which the reliability and accuracy of proximity sensing are improved may be provided.

Also, when the first input TC1 and the second input TC2 are simultaneously sensed, the control unit 200C may determine whether the first input TC1 is sensed, only based on the measurement signal.

The sensor layer 200 according to an embodiment of the present invention may improve the reliability of a measurement signal MS (refer to FIG. 12A) by using different electronic device driving methods through the first measurement mode and the second measurement mode.

Figure 12A:
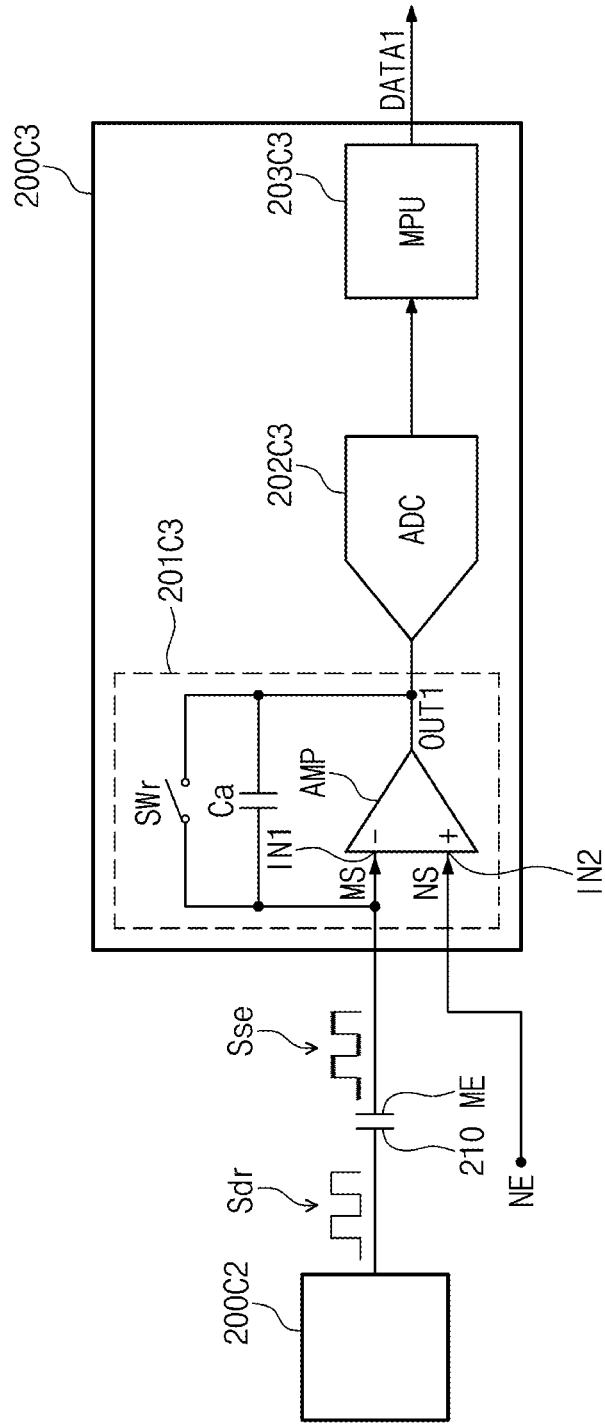
FIG. 12A illustrates operations of a sensor layer and a control unit in a first period according to an embodiment of the present invention.

FIG. 12A illustrates operations of a sensor layer and a control unit in a first period according to an embodiment of the present invention.

Referring to FIGS. 8 to 12A, the sensor layer 200 may include measurement electrodes ME, noise electrodes NE, and the plurality of first electrodes 210.

The measurement electrodes ME may overlap the first input TC1 in a plan view. The noise electrodes NE may not overlap the first input TC1 in a plan view.

The plurality of first electrodes 210 may form capacitances with the measurement electrodes ME and the noise electrodes NE.

Each of the plurality of first electrodes 210 may be electrically connected with the signal generating circuit 200C2. Each of the plurality of second electrodes 220 may be electrically connected with the input detecting circuit 200C3. One measurement electrode ME of the measurement electrodes ME and one first electrode 210 of the plurality of first electrodes 210 are illustrated in FIG. 12A as an example.

The signal generating circuit 200C2 may provide a driving signal Sdr to the first electrode 210. A sensing signal Sse corresponding to the driving signal Sdr may be output from the measurement electrode ME. The sensing signal Sse may be input to the input detecting circuit 200C3. Noise may be included in the sensing signal Sse. The measurement electrode ME may be referred to as one of the plurality of second electrodes 220.

The driving signal Sdr may not be provided to the noise electrodes NE. Each of the noise electrodes NE may be referred to as another of the plurality of second electrodes 220.

The measurement electrode ME may be spaced from one of the noise electrodes NE in the first direction DR1, with at least one of the others of the plurality of second electrodes 220 interposed therebetween.

The input detecting circuit 200C3 may perform amplification, conversion, and signal processing on the sensing signal Sse received from the second electrodes 220 and may detect hovering or biometric information depending on a result of the amplification, conversion, and signal processing. The input detecting circuit 200C3 may include a signal receiving unit 201C3, a conversion circuit 202C3, and a signal processing unit 203C3.

The signal receiving unit 201C3 may obtain the measurement signal MS from the measurement electrode ME. The measurement signal MS may include the sensing signal Sse. That is, the signal receiving unit 201C3 may receive the measurement signal MS from each of the second electrodes 220. The signal receiving unit 201C3 may amplify and output the sensing signal Sse. For example, the signal receiving unit 201C3 may be implemented with an analog front end (AFE) including an amplifier AMP. The amplifier AMP may include an operational amplifier. The signal receiving unit 201C3 may obtain a noise signal NS from one of the noise electrodes NE.

The signal receiving unit 201C3 may include a first input terminal IN1 and a second input terminal IN2.

The measurement electrode ME may be electrically connected with the first input terminal IN1 of the signal receiving unit 201C3. That is, an inverting input terminal of the amplifier AMP may be electrically connected with the measurement electrode ME. The measurement signal MS may be input to the first input terminal IN1. A capacitor Ca and a switch SWr may be connected in parallel between the first input terminal IN1 and an output terminal of the amplifier AMP.

One of the noise electrodes NE may be electrically connected with the second input terminal IN2 of the signal receiving unit 201C3. That is, a non-inverting input terminal of the amplifier AMP may be electrically connected with the noise electrode NE. The noise signal NS may be input to the second input terminal IN2. For example, the noise electrode NE that is connected with the second input terminal IN2 may be determined by the lookup table LUT (refer to FIG. 7). The operation of the signal receiving unit 201C3 of FIG. 12A may be referred to as a "differential sensing manner".

The signal receiving unit 201C3 may output a signal corresponding to a voltage difference of the first input terminal IN1 and the second input terminal IN2.

According to the present invention, the noise electrode NE, to which the driving signal Sdr is not provided, from among the plurality of second electrodes 220 may be electrically connected with the second input terminal IN2. A reference voltage of the signal receiving unit 201C3 may fluctuate depending on a capacitance change due to an environmental noise level of the noise electrode NE. That is, a reference potential of the signal receiving unit 201C3 may fluctuate depending on the noise signal NS provided from the noise electrode NE. The signal receiving unit 201C3 may cancel out the noise in the measurement signal MS based on the noise signal NS such that the noise is reduced or removed. Accordingly, the reliability and accuracy of proximity sensing or biometric information that the electronic device 1000 (refer to FIG. 1) obtains may be improved.

Also, according to the present invention, the plurality of second electrodes 220 may include the measurement electrode ME and the noise electrode NE, and the noise electrode NE may be spaced from the measurement electrode ME in the second direction DR2. As such, the noise electrode NE may receive a noise, the shape and/or magnitude of which is identical or very is similar to that of the measurement electrode ME. When the measurement electrode ME and the noise electrode NE are respectively connected with the first input terminal IN1 and the second input terminal IN2 of the signal receiving unit 201C3, a noise component (e.g., a ripple) included in the sensing signal Sse from the measurement electrode ME may be canceled out within the signal receiving unit 201C3. Accordingly, sensitivity may be improved by making a signal-to-noise ratio (SNR) of the sensor layer 200 high. That is, the reliability and accuracy of proximity sensing or biometric information that the electronic device 1000 (refer to FIG. 1) obtains may be improved.

The conversion circuit 202C3 may convert an analog signal received from the signal receiving unit 201C3 into a digital signal. The conversion circuit 202C3 may include an analog-to-digital converter (ADC).

The signal processing unit 203C3 may perform signal processing on the converted signal (i.e., digital signal) from the conversion circuit 202C3 and may detect hovering or biometric information from a result of the signal processing. The signal processing unit 203C3 may output a first signal DATA1 in which a noise level of the measurement signal MS is reduced based on the measurement signal MS and the noise signal NS. The first signal DATA1 may include proximity sensing or biometric information. For example, the signal processing unit 203C3 may detect whether the body of the user comes close, by comprehensively analyzing a signal (i.e., the sensing signal Sse experiencing amplification and noise reduction) received from each of the plurality of second electrodes 220 through the signal receiving unit 201C3 and the conversion circuit 202C3. According to an embodiment, the signal processing unit 203C3 may be implemented with a microprocessor (MPU) or a microcontroller (MCU).

The electronic device 1000 (refer to FIG. 1) according to an embodiment of the present invention may determine whether proximity is made, based on the first signal DATA1. For example, the electronic device 1000 (refer to FIG. 1) may detect hovering of the body of the user.

The electronic device 1000 (refer to FIG. 1) may detect biometric information of the body of the user. For example, the electronic device 1000 (refer to FIG. 1) may measure a skin moisture content of the user. The skin moisture content may indicate the degree of hydration of the skin, and the skin moisture content may decrease as the skin dries and may increase as the skin has more moisture. For example, dry skin may be referred to as "dry skin", and moist skin may be referred to as "oily skin".

Unlike the present embodiment, when the electronic device 1000 (refer to FIG. 1) measures hovering or biometric information based on a signal in which a noise is included, the noise may cause an error when the electronic device 1000 (refer to FIG. 1) determines whether proximity is made or biometric information. For example, when the electronic device 1000 (refer to FIG. 1) measures hovering, due to a distance by which the electronic device 1000 is spaced from the hovered object, a value of the noise may be similar to or greater than a sensing value; in this case, the noise may cause the reduction of accuracy at which the electronic device 1000 (refer to FIG. 1) measures hovering. Alternatively, for example, when the electronic device 1000 (refer to FIG. 1) measures a skin moisture content being one of the biometric information, a capacitance difference of the dry skin and the oily skin may be 10 pF (picofarad) or less. A value of the noise may be similar to or greater than the difference, and the noise may cause the reduction of accuracy at which the electronic device 1000 (refer to FIG. 1) measures the biometric information. However, according to the present invention, the signal receiving unit 201C3 may cancel out the noise in the measurement signal MS based on the noise signal NS such that the noise level is reduced or removed. Accordingly, the reliability and accuracy of proximity sensing or biometric information is that the electronic device 1000 (refer to FIG. 1) obtains may be improved.

Also, unlike the present embodiment, in the case where a signal of one second electrode 220 from which the first input TC1 is sensed and a signal of another second electrode 220 adjacent to the one second electrode 220 are respectively provided to the first input terminal IN1 and the second input terminal IN2 to reduce a nose, the one first electrode and the another second electrode adjacent thereto may be the measurement electrodes ME overlapping the first input TC1. As a signal associated with the hovering or biometric information included in the measurement signal MS is reduced by the signal processing unit 203C3 together with the noise, the accuracy at which the electronic device 1000 (refer to FIG. 1) measures the hovering or biometric information may be reduced. However, according to the present embodiment, the noise electrode NE, to which the driving signal Sdr is not provided, from among the plurality of second electrodes 220 may be electrically connected with the second input terminal IN2. The noise signal NS may not include the signal associated with the proximity sensing or biometric information and may include the noise only. The signal receiving unit 201C3 may cancel out the noise level of the measurement signal MS based on the noise signal NS such that the noise level is reduced or removed. Accordingly, the reliability and accuracy of proximity sensing or biometric information that the electronic device 1000 (refer to FIG. 1) obtains may be improved.

Figure 12B:
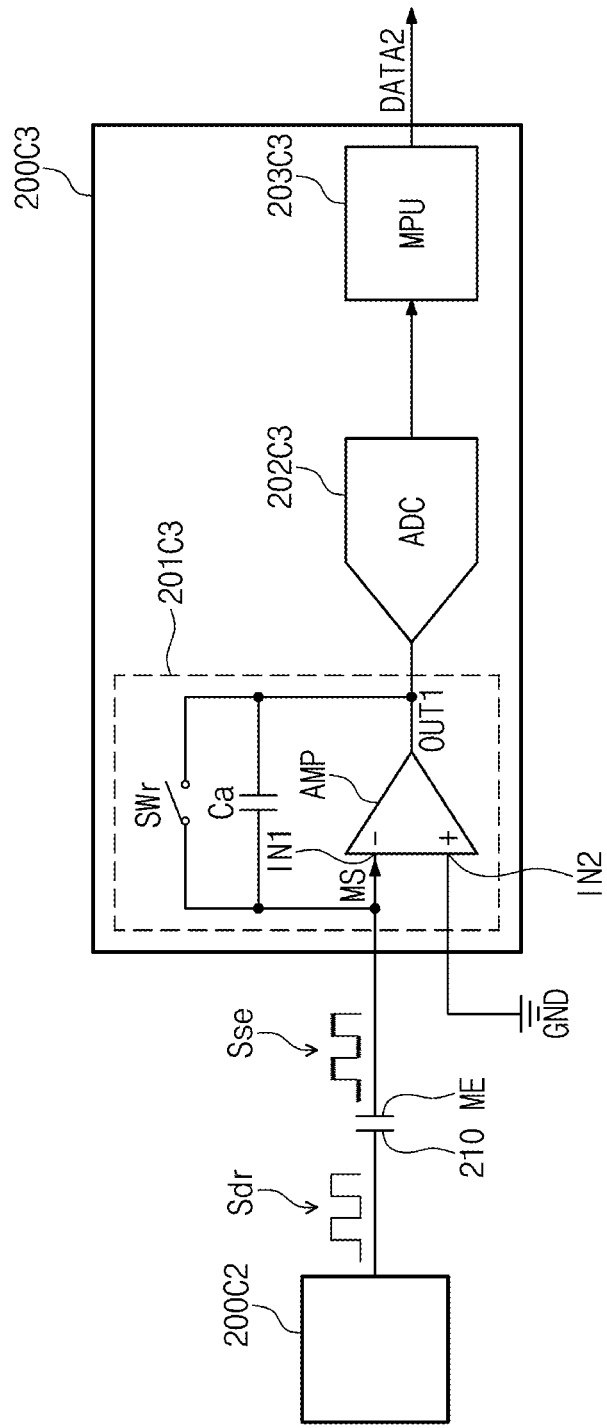
FIG. 12B illustrates operations of a sensor layer and a control unit in a second period according to an embodiment of the present invention.

FIG. 12B illustrates operations of a sensor layer and a control unit in a second period according to an embodiment of the present invention. In the description of FIG. 12B, the components that are described with reference to FIG. 12A are marked by the same reference numerals, and thus, additional description will be omitted to avoid redundancy.

Referring to FIGS. 8 to 12B, a ground electrode GND may be electrically connected with the second input terminal IN2 of the signal receiving unit 201C3. That is, the non-inverting input terminal of the amplifier AMP may be electrically connected with the ground electrode GND, that is, may be grounded. For example, the non-inverting input terminal of the amplifier AMP may be connected with a switch so as to be electrically connected with the noise electrode NE or the ground electrode GND depending on a period. The operation of the signal receiving unit 201C3 of FIG. 12B may be referred to as a "single sensing manner".

The signal processing unit 203C3 may output a second signal DATA2 including proximity sensing or biometric information based on the measurement signal MS.

The sensor layer 200 according to an embodiment of the present invention may operate in the first period PR1 of outputting the first data DATA1 and the second period PR2 of outputting the second signal DATA2. The first signal DATA1 may be a signal that is obtained by removing a noise from the measurement signal MS. The second signal DATA2 may be a signal that includes a signal associated with proximity sensing or biometric information of the measurement signal MS.

In the case of the first signal DATA1 according to an embodiment of the present invention, there is the probability that a part of a signal associated with the proximity sensing or biometric information is removed while a noise is removed. However, according to the present disclosure, the sensor layer 200 may operate in the first period PR1 and the second period PR2 during one frame FR1. The first signal DATA1 that includes a noise-free signal associated with the proximity sensing or biometric information may be output in the first period PR1. The second signal DATA2 that includes a signal associated with the hovering or biometric information may be output in the second period PR2. The control unit 200C may combine the first signal DATA1 and the second signal DATA2 to obtain noise-reduced or noise-free proximity sensing or biometric information. That is, the reliability of the electronic device 1000 (refer to FIG. 1) may be improved by reducing or removing a noise occurring in measuring the hovering or biometric information such that a signal-to-noise ratio (SNR) increases.

Figure 13:
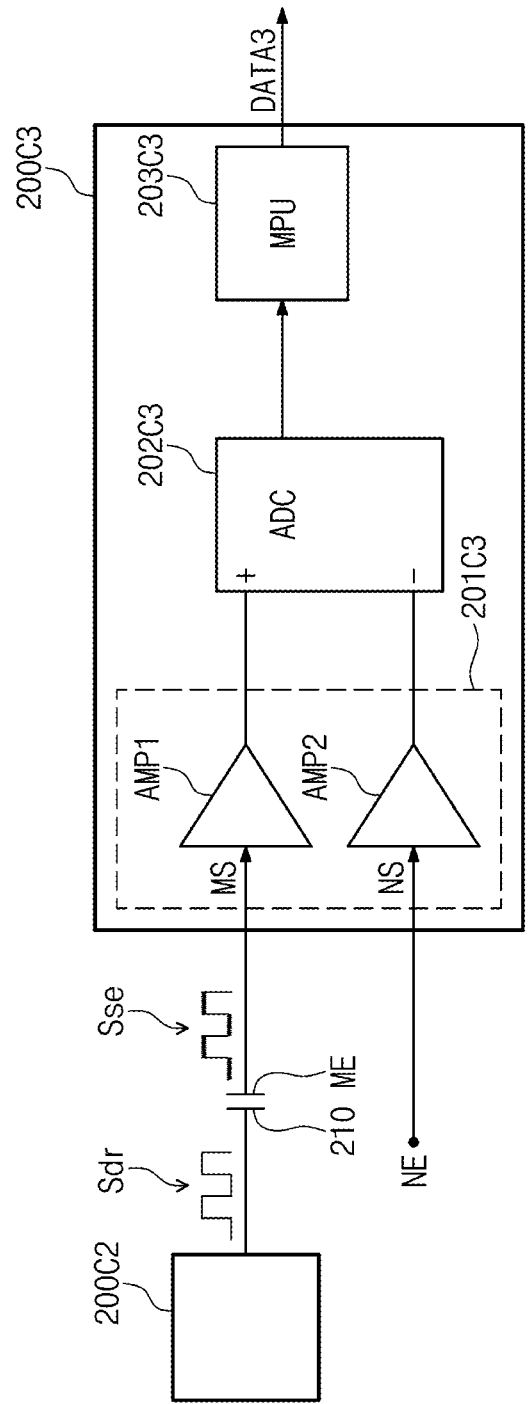
FIG. 13 illustrates operations of a sensor layer and a control unit in a first period according to an embodiment of the present invention.

FIG. 13 illustrates operations of a sensor layer and a control unit in a first period according to an embodiment of the present invention. In the description of FIG. 13, the components that are described with reference to FIG. 12A are marked by the same reference numerals, and thus, additional description will be omitted to avoid redundancy.

Referring to FIG. 13, the signal receiving unit 201C3 may include a first amplifier AMP1 and a second amplifier AMP2.

The first amplifier AMP1 may receive the measurement signal MS from the measurement electrode ME. The second amplifier AMP2 may receive the noise signal NS from the noise electrode NE.

The conversion circuit 202C3 may convert the measurement signal MS output from the first amplifier AMP1 into a digital signal. The conversion circuit 202C3 may convert the noise signal NS output from the second amplifier AMP2 into a digital signal.

The conversion circuit 202C3 may reduce the noise in the measurement signal MS based on the digital signals of the measurement signal MS and the noise signal NS.

The signal processing unit 203C3 may output a third signal DATA3 in which the noise in the measurement signal MS is reduced based on the digital signals of the measurement signal MS and the noise signal NS.

According to the present embodiment, the conversion circuit 202C3 may receive the digital signals of the measurement signal MS and the noise signal NS. The digital signal of the noise signal NS may change depending on a capacitance change due to an environmental noise. The conversion circuit 202C3 may reduce or remove noise by canceling out the noise in the digital signal of the measurement signal MS based on the digital signal of the noise signal NS. Accordingly, the reliability and accuracy of proximity sensing or biometric information that the electronic device 1000 (refer to FIG. 1) obtains may be improved.

As described above, a noise electrode, to which a driving signal is not provided, from among a plurality of first electrodes, may be electrically connected with a signal receiving unit of a control unit. A reference voltage of the signal receiving unit may fluctuate depending on a capacitance change due to environmental noise in the noise electrode. The signal receiving unit may cancel out the noise in a measurement signal based on a noise signal such that the noise level is reduced or removed. Accordingly, the reliability and accuracy of proximity sensing or biometric information that an electronic device obtains may be improved.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device comprising:
a display layer;
a sensor layer configured to sense a first input by proximity sensing and a second input by a touch, wherein the sensor layer is disposed on the display layer and includes a plurality of first electrodes extending in a first direction and a plurality of second electrodes extending in a second direction intersecting the first direction; and
a control unit configured to control the sensor layer, wherein:
when the first input is sensed, the control unit is configured to:
obtain a measurement signal from one of the plurality of first electrodes;
obtain a noise signal from another of the plurality of first electrodes; and
determine whether the first input is sensed based on the measurement signal and the noise signal;
the control unit includes a signal receiving unit including a first input terminal and a second input terminal;
the first input terminal is electrically connected with the one of the plurality of first electrodes, and the second input terminal is electrically connected with the another of the plurality of first electrodes;
the sensor layer operates in a first sensing mode when the display layer displays a still image or does not display an image, and operates in a second sensing mode different from the first sensing mode when the display layer displays a moving image;
the first sensing mode and the second sensing mode each include a plurality of frames including a first frame and a second frame provided after the first frame;
the first frame in the first sensing mode includes one first period and a plurality of second periods;
the first frame in the second sensing mode includes a plurality of first periods and a plurality of second periods arranged alternately in time, or a plurality of consecutive first periods and a plurality of consecutive second periods; and
differential sensing is performed in each of the first periods, and single sensing is performed in each of the second periods.

2. The electronic device of claim 1, wherein, in the first period, the measurement signal is applied to the first input terminal, and the noise signal is applied to the second input terminal, to provide the differential sensing.

3. The electronic device of claim 2, wherein the control unit reduces a noise level of the measurement signal based on a signal output from the signal receiving unit, to provide the single sensing.

4. The electronic device of claim 2, wherein, in each of the second periods, the measurement signal is applied to the first input terminal, and a ground signal is applied to the second input terminal.

5. The electronic device of claim 1, wherein:
in the first sensing mode, the another of the plurality of first electrodes is spaced from the one of the plurality of first electrodes as much as a first distance; and
in the second sensing mode, the another of the plurality of first electrodes is spaced from the another of the plurality of first electrodes as much as a second distance smaller than the first distance.

6. The electronic device of claim 1, further comprising a memory configured to store a first lookup table in which the another of the plurality of first electrodes is selected to correspond to the one of the plurality of first electrodes, and a second lookup table different from the first lookup table.

7. The electronic device of claim 6, wherein:
the control unit obtains the measurement signal and the noise signal based on the first lookup table when the first input is sensed; and
the control unit obtains the measurement signal and the noise signal based on the second lookup table when the first input and the second input are sensed.

8. The electronic device of claim 1, wherein, when the second input is sensed, the another of the plurality of first electrodes does not overlap an area in which the touch is applied.

9. The electronic device of claim 1, wherein, when the second input is sensed, the control unit determines whether the first input is sensed based only on the measurement signal.

10. The electronic device of claim 1, wherein:
the control unit includes a conversion circuit configured to convert the measurement signal and the noise signal into digital signals, respectively; and
the control unit reduces a noise level of the measurement signal based on the digital signals of the measurement signal and the noise signal.

11. An electronic device comprising:
a display layer;
a sensor layer disposed on the display layer, the sensor layer including a plurality of first electrodes extending in a first direction and configured to measure hovering and a touch of a body; and
a control unit configured to control the sensor layer, wherein the control unit is configured to:
obtain a measurement signal from each of measurement electrodes, which overlap the body in a plan view, from among the plurality of first electrodes;
obtain a noise signal from each of noise electrodes, which do not overlap the body in the plan view, from among the plurality of first electrodes; and
reduce a noise level of the measurement signal based on the measurement signal and the noise signal,
wherein:
the control unit includes a signal receiving unit including a first input terminal and a second input terminal;
the first input terminal is electrically connected with each of the measurement electrodes, and the second input terminal is electrically connected with each of the noise electrodes;
the sensor layer operates in a first sensing mode when the display layer displays a still image or does not display an image, and operates in a second sensing mode different from the first sensing mode when the display layer displays a moving image;
the first sensing mode and the second sensing mode each include a plurality of frames including a first frame and a second frame provided after the first frame;
the first frame in the first sensing mode includes one first period and a plurality of second periods;
the first frame in the second sensing mode includes a plurality of first periods and a plurality of second periods arranged alternately in time, or a plurality of consecutive first periods and a plurality of consecutive second periods; and
differential sensing is performed in each of the first periods, and single sensing is performed in each of the second periods.

12. The electronic device of claim 11,
wherein, in sensing the touch, the measurement signal is applied to the first input terminal and the noise signal is applied to the second input terminal, to provide the differential sensing.

13. The electronic device of claim 12, wherein the control unit reduces the noise level of the measurement signal based on a signal output from the signal receiving unit.

14. The electronic device of claim 12, wherein, in sensing the hovering, the measurement signal is applied to the first input terminal and a ground signal is applied to the second input terminal, to provide the single sensing.

15. The electronic device of claim 11, wherein:
the control unit includes a conversion circuit configured to convert the measurement signal and the noise signal into digital signals, respectively; and
the control unit reduces the noise level of the measurement signal based on the digital signals of the measurement signal and the noise signal.

16. The electronic device of claim 11, further comprising a memory configured to store a lookup table in which another of the plurality of first electrodes is selected to correspond to one of the plurality of first electrodes,
wherein the control unit selects a noise electrode of the noise electrodes based on the lookup table.

17. An electronic device comprising:
a display layer;
a sensor layer configured to measure biometric information of a body, wherein the sensor layer is disposed on the display layer and includes a plurality of first electrodes extending in a first direction and a plurality of second electrodes extending in a second direction intersecting the first direction; and
a control unit configured to control the sensor layer, wherein the control unit is configured to:
obtain a measurement signal from one of the plurality of first electrodes;
obtain a noise signal from another of the plurality of first electrodes; and
reduce a noise level of the measurement signal based on the measurement signal and the noise signal,
wherein:
the control unit includes a signal receiving unit including a first input terminal and a second input terminal;
the first input terminal is electrically connected with the one of the plurality of first electrodes and the second input terminal is electrically connected with the another of the plurality of first electrodes;
the sensor layer operates in a first sensing mode when the display layer displays a still image or does not display an image, and operates in a second sensing mode different from the first sensing mode when the display layer displays a moving image;
the first sensing mode and the second sensing mode each include a plurality of frames including a first frame and a second frame provided after the first frame;
the first frame in the first sensing mode includes one first period and a plurality of second periods;
the first frame in the second sensing mode includes a plurality of first periods and a plurality of second periods arranged alternately in time, or a plurality of consecutive first periods and a plurality of consecutive second periods; and
differential sensing is performed in each of the first periods, and single sensing is performed in each of the second periods.

18. The electronic device of claim 17, wherein, in a plan view, the one of the plurality of first electrodes overlaps the body, and the another of the plurality of first electrodes does not overlap the body.

19. The electronic device of claim 17,
wherein, in each of the first periods, the measurement signal is applied to the first input terminal and the noise signal is applied to the second input terminal, to provide the differential sensing.

20. The electronic device of claim 19, wherein, in each of the second periods, the measurement signal is applied to the first input terminal and a ground signal is applied to the second input terminal, to provide the single sensing.

21. The electronic device of claim 19, wherein the control unit reduces the noise level of the measurement signal based on a signal output from the signal receiving unit.

22. The electronic device of claim 17, further comprising a memory configured to store a lookup table in which a specific electrode not overlapping the body in a plan view from among the plurality of first electrodes is selected to correspond to each of first electrodes overlapping the body in a plan view from among the plurality of first electrodes.

23. The electronic device of claim 22, wherein the control unit selects the one of the plurality of first electrodes based on the lookup table.

24. The electronic device of claim 17, wherein:
the control unit includes a conversion circuit configured to convert the measurement signal and the noise signal into digital signals; and
the control unit reduces the noise level of the measurement signal based on the digital signals of the measurement signal and the noise signal.

25. The electronic device of claim 17, wherein the one of the plurality of first electrodes is spaced from the another of the plurality of first electrodes, and at least one of others of the plurality of first electrodes is interposed therebetween.

26. The electronic device of claim 17, wherein each of the plurality of first electrodes is supplied with a first touch signal from the control unit, and each of the plurality of second electrodes provides a second touch signal to the control unit based on the first touch signal.

* * * * *